(12) United States Patent
Kumar et al.

(10) Patent No.: US 11,640,649 B2
(45) Date of Patent: May 2, 2023

(54) METHODS AND APPARATUS FOR EFFICIENT RANGE CALCULATION

(71) Applicant: Samsung Electronics Co., Ltd., Suwon-si (KR)

(72) Inventors: Rahul Kumar, Sunnyvale, CA (US); F N U Gurupad, San Jose, CA (US); David Tannenbaum, Austin, TX (US)

(73) Assignee: SAMSUNG ELECTRONICS CO., LTD.

( * ) Notice: Subject to any disclaimer, the term of this patent is extended or adjusted under 35 U.S.C. 154(b) by 90 days.

(21) Appl. No.: 16/792,875

(22) Filed: Feb. 17, 2020

(65) Prior Publication Data

US 2020/0402203 A1    Dec. 24, 2020

Related U.S. Application Data

(60) Provisional application No. 62/864,445, filed on Jun. 20, 2019, provisional application No. 62/863,867, filed on Jun. 19, 2019.

(51) Int. Cl.
*G06T 3/40* (2006.01)
*G06T 15/40* (2011.01)
*G06T 15/80* (2011.01)

(52) U.S. Cl.
CPC ............ *G06T 3/4007* (2013.01); *G06T 15/40* (2013.01); *G06T 15/80* (2013.01)

(58) Field of Classification Search
CPC ...... G06T 3/4007; H04N 19/80; H04N 19/59; H04N 13/111; H04N 7/0135; H04N 7/0142
See application file for complete search history.

(56) References Cited

U.S. PATENT DOCUMENTS

| | | | |
|---|---|---|---|
| 7,324,709 B1 * | 1/2008 | Wang | G06T 3/4007 348/448 |
| 9,734,597 B2 | 8/2017 | Akenine-Moller et al. | |
| 9,870,639 B2 | 1/2018 | Chung et al. | |

(Continued)

OTHER PUBLICATIONS

Marsh et al., "Image Zooming using Corner Matching", May 2018, IEEE, 2018 IEEE International Conference on Electro/Information Technology (EIT), p. 69-72. (Year: 2018).*

(Continued)

*Primary Examiner* — Vincent Rudolph
*Assistant Examiner* — Timothy Choi
(74) *Attorney, Agent, or Firm* — Renaissance IP Law Group LLP

(57) ABSTRACT

An interpolation method may include scheduling spatially adjacent image blocks for interpolation, and calculating ranges of values of an attribute of the image blocks, wherein at least one value for a first one of the image blocks may be used for a second one of the image blocks. Calculating the ranges of values may include calculating a root value of the attribute at a root location of an array of the spatially adjacent image blocks, and adding incremental values of the attribute to the root value at points of the image blocks that are offset from the root location. The root location may be centrally located in an array of the spatially adjacent image blocks. The interpolation may be calculated in a diagonal hierarchical manner based on a plane equation.

18 Claims, 15 Drawing Sheets

(56) References Cited

U.S. PATENT DOCUMENTS

| | | | |
|---|---|---|---|
| 10,102,609 B1 | 10/2018 | Ranganathan et al. | |
| 2003/0043148 A1* | 3/2003 | Mei | G06T 15/405 |
| | | | 345/421 |
| 2004/0130552 A1* | 7/2004 | Duluk, Jr. | G06T 15/04 |
| | | | 345/506 |
| 2013/0272405 A1* | 10/2013 | Jeon | H04N 19/11 |
| | | | 375/240.15 |
| 2015/0039661 A1 | 2/2015 | Blomgren et al. | |
| 2016/0092168 A1 | 3/2016 | Lutz et al. | |
| 2016/0126974 A1 | 5/2016 | Lutz et al. | |
| 2017/0178362 A1* | 6/2017 | Akenine-Moller | G06T 9/00 |
| 2017/0315778 A1 | 11/2017 | Sano | |
| 2018/0176601 A1 | 6/2018 | Jeong et al. | |
| 2018/0278264 A1 | 9/2018 | Rovers | |
| 2018/0293786 A1 | 10/2018 | Insko et al. | |

OTHER PUBLICATIONS

Scarmana, "An Application of the Least Squares Plane Fitting Interpolation Process to Image Reconstruction and Enhancement", May 2016, FIG Working Week 2016—Recovery from Disaster, p. 1-10. (Year: 2016).*

Biadgie et al., "Edge Adaptive Hierarchical Interpolation for Lossless and Progressive Image Transmission", Nov. 2011, KSII, Transactions on Internet and Information Systems, vol. 5, No. 5, p. 2068-2086. (Year: 2011).*

* cited by examiner

METHODS AND APPARATUS FOR EFFICIENT RANGE CALCULATION

This application claims priority to, and the benefit of, U.S. Provisional Patent Application Ser. No. 62/864,445 titled "An Apparatus For Energy Efficient Range Interpolation" filed Jun. 20, 2019 which is incorporated by reference, and U.S. Provisional Patent Application Ser. No. 62/863,867 titled "Apparatus For Energy Efficient Floating Point To Unorm Integer Conversion" filed Jun. 19, 2019 which is also incorporated by reference.

BACKGROUND

Interpolation is a process used to determine the value of an attribute at unknown data points based on the value at known data points. Interpolation may be used, for example, in graphics processing to determine the coverage or depth of pixels located inside a primitive, which is a fundamental unit of geometry used to create larger images. Interpolation may be performed on a sample basis to determine the specific values of individual pixels, or on a range basis to determine the minimum and maximum values of a block of pixels. One application of range interpolation is to determine the depth range of a covered block of pixels. This depth range information may be used by hidden surface removal (HSR) logic to reduce the number of pixels that must be rendered by a pixel shader, which tends to be a bottleneck in a graphics pipeline. If the HSR logic (also referred to as testing and rejection logic) determines that a block of pixels is not visible in an image because it is located behind other pixels, it is rejected from the pipeline to prevent overdraw, thereby reducing the workload on the pixel shader.

Increasing demands for higher resolution graphics, as well as increasing complexity of pixel shader programs, has led to increasing workloads on pixel shaders. Thus, there is a need to interpolate coverage and depth at high bandwidth to detect and eliminate overdraw.

Interpolation, however, is a computation-intensive process that tends to be expensive in terms of energy consumption, surface area on integrated circuits, execution time, etc. Thus, there is a need for interpolators that may operate with greater efficiency and/or throughput, and/or at lower cost.

SUMMARY

An interpolation method may include scheduling spatially adjacent image blocks for interpolation, and calculating ranges of values of an attribute of the image blocks, wherein at least one value for a first one of the image blocks may be used for a second one of the image blocks. Calculating the ranges of values may include calculating a root value of the attribute at a root location of an array of the spatially adjacent image blocks, and adding incremental values of the attribute to the root value at points of the image blocks that are offset from the root location. Calculating the ranges of values may further include comparing values of the attribute for each image block, and selecting the minimum and maximum values for each image block.

The attribute may have a gradient with a direction, and the incremental values of the attribute may be added to the root value at points determined by the direction of the gradient. The points determined by the direction of the gradient may include diagonally opposite points of each image block. Calculating the ranges of values may further include selecting the diagonally opposite points of each image block as the minimum and maximum values of the attribute for the image block. The root location may be centrally located in the array of the spatially adjacent image blocks.

The array may be a first array, the root value may be a first root value, the root location may be a first root location, and calculating the ranges of values may further include calculating a second root value of the attribute at a second root location of a second array of the spatially adjacent image blocks, wherein the second array is spatially adjacent to the first array, and adding incremental values of the attribute to the second root value at points of the image blocks of the second array that are offset from the second root location. Values for one or more points of image blocks in the first array that are coincident with image blocks in the second array may be omitted from calculations in the second array. One or more values for one or more image blocks in the first array may be used for one or more image blocks in the second array.

The ranges of values may be calculated by an interpolator having a first array size, and scheduling spatially adjacent image blocks may include selecting covered image blocks from an input array having a second array size, arranging the covered image blocks in an output array having the first array size, and sending the output array to the interpolator. The input array may include a pattern of covered image blocks that exceeds the first array size, and the covered image blocks may be arranged in two output arrays. The two output arrays may be sent to the interpolator sequentially. Selecting covered image blocks may include selecting horizontally or vertically aligned image blocks. The attribute may be interpolated according to a plane equation. The method may further include converting the values of the attribute from a first high precision data type to a second lower precision data type. Values that are minimums may be rounded downward during conversion, and values that are maximums may be rounded upward during conversion.

An interpolation system may include a scheduling apparatus configured to send arrays of image blocks to an interpolator, wherein at least some of the arrays include spatially adjacent image blocks, and a multi-block interpolator configured to calculate ranges of values of an attribute of the image blocks, wherein at least one of the values may be reused within one of the arrays. The multi-block interpolator may be configured to calculate the ranges using a plane equation. The multi-block interpolator may be configured to calculate the ranges using diagonal hierarchical calculations. The multi-block interpolator is configured to calculate a root value of the attribute at a root location of an array of the spatially adjacent image blocks, and add incremental values of the attribute to the root value at points of the image blocks that are offset from the root location. The root location may be centrally located in the array of the spatially adjacent image blocks.

A multi-block interpolator may include a root unit configured to interpolate a root value of an attribute at a root location of an array of spatially adjacent image blocks, a delta generator configured to calculate incremental values of the attribute at points offset from the root location, at least one adder configured to calculate values of the attribute at the points offset from the root location by adding the incremental values to the root value, and a multiplexer configured to select a minimum or maximum of the values of the attribute at the root location and the points offset from the root location. The delta generator may include a multiplier configured to generate a first product by multiplying a first gradient of a plane equation by a number of elements in a first dimension of a block. The multiplier may be further configured to generate a second product by multiplying a second gradient of the plane equation by a number of elements in a second dimension of the block. The delta generator may further include an adder configured to add the first and second products.

BRIEF DESCRIPTION OF THE DRAWINGS

The figures are not necessarily drawn to scale and elements of similar structures or functions are generally represented by like reference numerals for illustrative purposes throughout the figures.

The figures are only intended to facilitate the description of the various embodiments disclosed herein. The figures do not describe every aspect of the teachings disclosed herein and do not limit the scope of the claims. The accompanying drawings, together with the specification, illustrate example embodiments of the present disclosure, and, together with the description, serve to explain the principles of the present disclosure.

DETAILED DESCRIPTION

Overview

Figure 1:
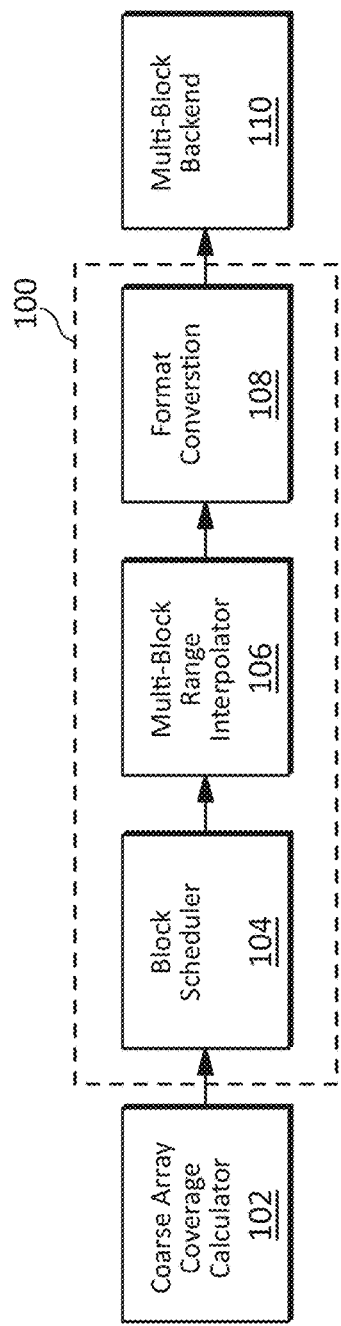
FIG. 1 illustrates some components and data flow in an example embodiment of an interpolation system according to this disclosure.

This disclosure encompasses numerous inventive principles relating to range interpolation and/or associated calculations which may improve the efficiency, speed, area usage, and/or other aspects of interpolation processes, and/or associated calculations, and/or related apparatus. These principles may have independent utility and may be embodied individually, and not every embodiment may utilize every principle. Moreover, the principles may also be embodied in various combinations that may amplify the benefits of the individual principles in a synergistic manner.

Some of the inventive principles involve interpolating multiple adjacent blocks together which may enable an interpolated value to be used for two adjacent blocks, thereby reducing the total number of calculations required for an array of adjacent blocks.

Some additional inventive principles relate to the principle that a planar attribute may have minimum and maximum values only at the corners of a rectangle. Thus, the minimum and maximum values of a planar surface parameter over a rectangular block may be found by interpolating the values at the four corners. Moreover, combining this principle with multiple adjacent blocks may reduce the number of calculations required to find the minimum and maximum values for each block. For example, in an embodiment with a 2×2 array of blocks, the values at all four corners of all four blocks may be found with nine calculations, rather than the sixteen calculations that may be required to interpolate each block individually.

Some additional principles involve exploiting a directional aspect of an attribute to reduce the number of calculations performed for each block. For example, when interpolating a planar attribute over a rectangular block, the minimum and maximum values may only be located at diagonally opposed corners based on a planar gradient direction. Thus, values may only need to be interpolated at two opposing corners of the block, rather than all four. Moreover, combining this principle with those mentioned above may enable a further reduction in calculations. For example, in an embodiment with a 2×2 array of blocks, values of the attribute may only need to be interpolated at seven points, rather than nine.

Some additional principles relate to the use of a root value that may be centrally located in an array of blocks. In some embodiments, for example, by calculating the root value of a planar attribute at the center of a 2×2 array of blocks, the value of the attribute at the remaining corners may be calculated by adding just one incremental value, or delta. (which may be fast, simple, and/or efficient to calculate) to the root value based on the positive and negative offsets of the remaining corners from the root location.

Some additional principles relate to scheduling processes that may send spatially adjacent covered blocks to a multi-block interpolator in a sequence that may improve or optimize the interpolation process. For example, a scheduler may attempt to schedule as many spatially adjacent blocks as possible to reduce the downstream interpolation cost.

Some additional principles relate to techniques for converting a higher precision number format, which may be used during an interpolation operation, to a lower precision format for use during a downstream operation, while assuring that the maximum and minimum interpolated values of an attribute are properly represented. For example, in some embodiments, numbers in a floating point format may be converted to numbers in an unsigned, normalized (unorm) format in a manner that rounds maximum values upward and minimum values downward.

The inventive principles disclosed herein may also be implemented in applications other than range interpolation such as sample interpolation. For example, the principles may be applied to rasterization based on edge equations. Moreover, the interpolation principles may be applied to any attribute, or parameter, including depth, color, texture, etc. The principles may also be implemented using any data format at any point in the data flow including floating point numbers of any precision, fixed point numbers of any precision, signed and unsigned integers of any length, unorm numbers of any length, etc.

In some embodiments, the inventive principles disclosed herein may be helpful in range based depth-testing and depth-updates which may help reduce the burden on a pixel shader. In some embodiments with a tile-based rendering system, the interpolated depth range may be used in a binning pass (to reduce the stream of primitives in tiles) and/or in a color pass (to develop an improved depth buffer). The principles of this disclosure, however, are not limited to use in any particular type of system. They may be applied, for example, in graphics systems of the Immediate Mode Rendering (IMR) and Tile Based Deferred Rendering (TBDR) forms, as well as others. Moreover, in some embodiments, in addition to providing various improvements that may reduce the cost and/or improve the speed of depth testing, the inventive principles may improve cost, energy, performance, and/or other metrics for interpolation, memory, and/or backend processes, and/or apparatus.

High-Level Dataflow

Figure 2:
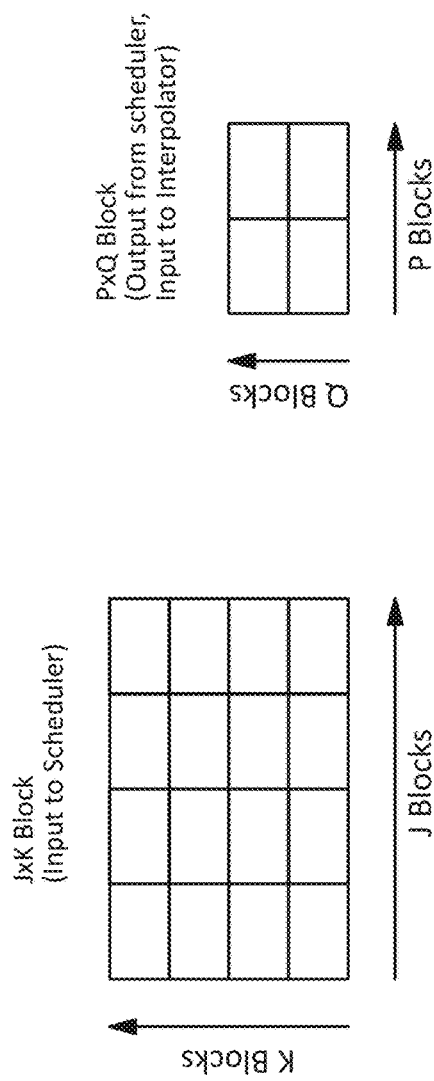
FIG. 2 illustrates some arrays of blocks that may be used at various points in an interpolation system according to this disclosure.

FIG. 1 illustrates some components and data flow in an example embodiment of an interpolation system according to this disclosure. FIG. 2 illustrates some arrays of blocks that may be used at various points in the system of FIG. 1.

A block may be a two-dimensional sub-section of an image, where each block may have n pixels in an X-direction and m pixels in a Y-direction, and thus a total of $N_{PPB}$=n×m pixels per block. To provide a convenient context for illustrating the inventive principles of this disclosure, the embodiment of FIG. 1 and other embodiments disclosed below may be described in the context of an image made up of a grid of pixels. However, the principles may be applied to range interpolation of any grid of elements that may be sub-divided into blocks of elements.

Referring to FIG. 1, an interpolation system 100 according to this disclosure may include a block scheduler 104, a multi-block range interpolator 106, and a format conversion unit 108. The block scheduler 104 may receive an input stream of J×K arrays of blocks (J blocks by K blocks, as shown in FIG. 2) from a coarse rasterizer 102 (also referred to as a coarse array coverage calculator). The coarse rasterizer may search for and find the coverage of the blocks based on the size and shape of a primitive in an image. In some implementations, the block scheduler 104 may receive one J×K array of blocks from the coarse rasterizer per clock cycle. The block scheduler 104 may rearrange the covered blocks into P×Q arrays (P blocks by Q blocks, as shown in FIG. 2) and dispatch the P×Q arrays downstream for further processing by the multi-block range interpolator 106.

The multi-block range interpolator 106 may interpolate a range (i.e., minimum and maximum values) for each block in a P×Q input array. In some implementations, all of the P×Q blocks may be interpolated together, for example, in a single clock cycle. Thus, the multi-block range interpolator 106 may have a throughput, or bandwidth, of N blocks per clock cycle, where N=P×Q.

In some embodiments, finding coarse coverage on more blocks per cycle may enable the scheduler 104 to dispatch the blocks downstream faster, thereby improving performance. Moreover, interpolating multiple adjacent blocks together may improve the efficiency, cost, and/or speed, etc., of the interpolator 106. Thus, in some implementations, a block scheduler may increase or maximize the number of spatially adjacent blocks it dispatches to reduce the downstream interpolation cost and/or improve other metrics.

Although there are no limits on the values of J. K. P. and Q according to this disclosure, in some implementations, the arrays may be sized such that P≤J and Q≤K. Moreover, since the coarse rasterizer may find coverage in only a subset of the search space of a J×K block based on the size and shape of a primitive, it may be beneficial to have P<J and Q<K. Depending on the implementation details, there may be a tradeoff in the area cost associated with larger array sizes.

In the example of FIG. 2, the J×K array is 4×4, and the P×Q array is 2×2. In any given implementation, optimal values of these design parameters may be determined, for example, based on benchmark profiling. In some implementations, using integral powers of 2 for J. K. P. and/or Q may provide benefits such as reduced hardware costs.

The format conversion unit 108 may convert the number format of interpolated values to one or more formats that may be used by backend apparatus 110, which may include, for example, rejection logic for hidden surface remove to eliminate overdraw by a pixel shader. To reduce the cost, area, energy consumption, etc., the format conversion unit 108 may, for example, convert 32-bit floating point numbers (FP32) to fixed point or unorm numbers which may be used by the backend apparatus.

Block Scheduling

Some of the J×K arrays received from the coarse rasterizer 102 may have more than N=P×Q covered blocks. Even if a J×K array has fewer than N covered blocks, the covered blocks may be arranged in a pattern that may not fit in a P×Q array. In these situations, the block scheduler 104 may break down the pattern of covered blocks received in a J×K array and rearrange them into a sequence of P×Q arrays that is dispatched sequentially to the interpolator 106, for example, over multiple clock cycles. In general, the block scheduler 104 may attempt to schedule P×Q arrays of blocks together, including as many spatially adjacent covered blocks as possible, as this may reduce downstream interpolation costs and/or improve other metrics.

In some embodiments, a block scheduler 104 may create a coverage mask to implement an arbitration system for scheduling blocks downstream in which rows, columns, or other arrangements of adjacent blocks with coverage may have priority over those having fewer adjacent blocks with coverage. For example, in the embodiments illustrated in FIGS. 4D-4G, rows or columns having two adjacent covered blocks (e.g., determined by a logical AND) may be prioritized over rows or columns having only one covered block (e.g., determined by a logical OR).

Figure 3:
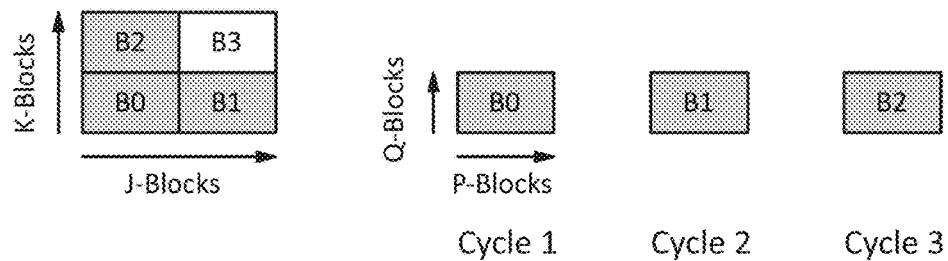
FIG. 3 illustrates an example embodiment of a scheduling process according to this disclosure.

FIG. 3 illustrates an example embodiment of a scheduling process according to this disclosure. In FIG. 3, as well as other figures illustrating example scheduling processes below, covered blocks may be indicated by shading, whereas uncovered blocks may be unshaded. In the example of FIG. 3, the input array may have dimensions J×K=2×2, the output array may have dimensions P×Q=1×1, and therefore, the number of bocks in the output array may be N=1. The three covered blocks in the input array B0, B1, and B2 may be dispatched as 1-block arrays over three clock cycles. Because B3 is not covered, it may not be dispatched to the interpolator. In some implementations of this embodiment, a single bit coverage mask may be used to schedule blocks. A leading bit detector (e.g., for detecting a leading "1") may be used to schedule the covered blocks sequentially, and another mask may be used to keep track of blocks already dispatched.

FIGS. 4A-4I illustrate other example embodiments of scheduling processes according to this disclosure in which J×K=2×2. N=2, and P×Q=2×1 or 1×2.

Figure 4A:
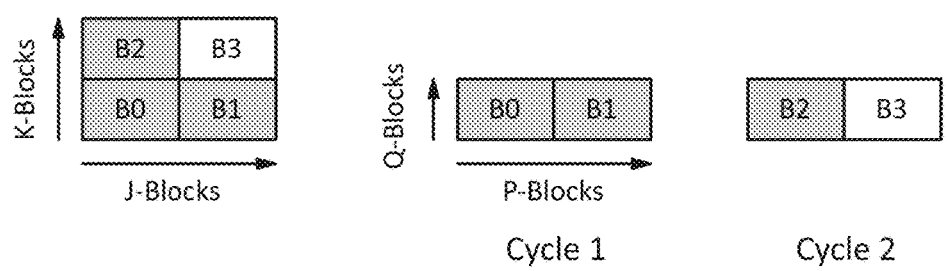
FIGS. 4A-4I illustrate other example embodiments of scheduling processes according to this disclosure.

In the example of FIG. 4A, the three covered blocks in the input array B0, B1, and B2 may be dispatched as two 2-block arrays over two cycles.

Figure 4B:
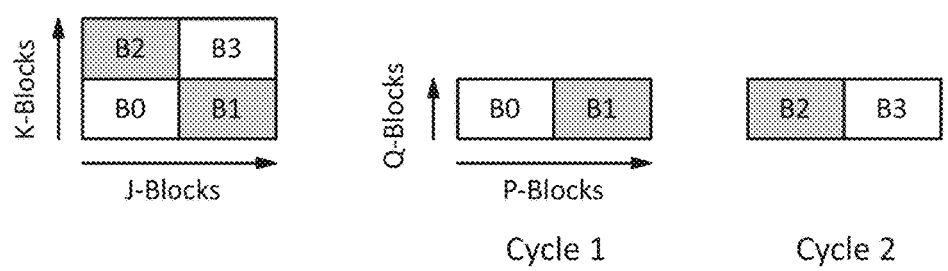
Figure 4C:
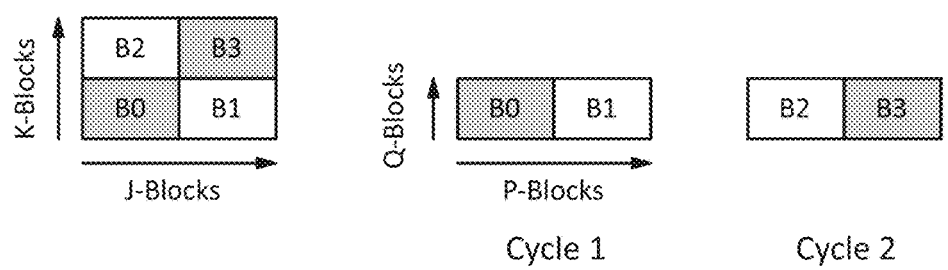
Figure 4D:
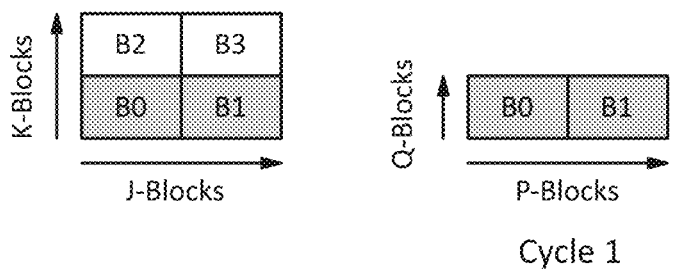
Figure 4E:
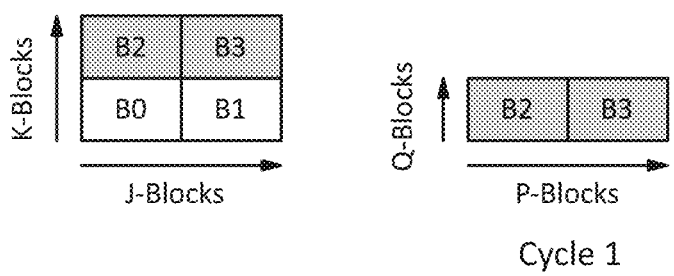
Figure 4F:
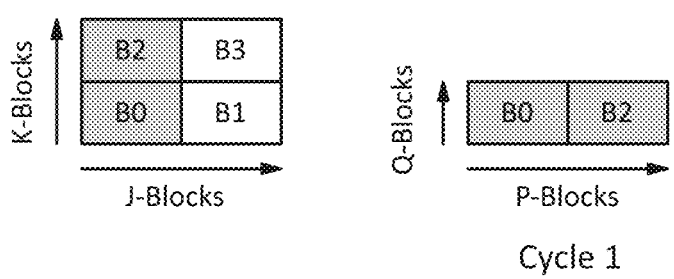
Figure 4G:
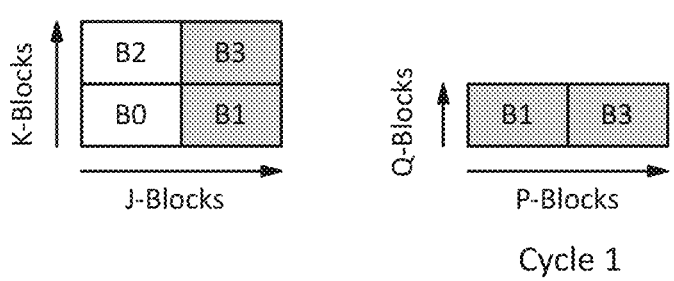

In the examples of FIGS. 4B and 4C, the 2×2 input array has two diagonally adjacent covered blocks. In some implementations, having only diagonal covered blocks may not be mathematically possible for rendered primitives following the Direct X (DX) or OpenGL pipelines because zero thickness triangles, lines, and points may be culled in earlier pipeline stages. Nonetheless, the two covered blocks may be scheduled over two cycles as shown in FIGS. 4B and 4C to provide functionality support, even if not optimally efficient, for the unlikely event that two diagonally adjacent covered blocks appear in the 2×2 input array.

In the examples of FIGS. 4D-4G, each 2×2 input array may have two horizontally or vertically aligned covered blocks. In these cases, the two covered blocks may be scheduled over a single cycle in a single 2-block output array, regardless of the horizontal or vertical alignment of the covered blocks in the input arrays, and regardless of the 2×1 or 1×2 alignment of the output arrays.

Figure 4H:
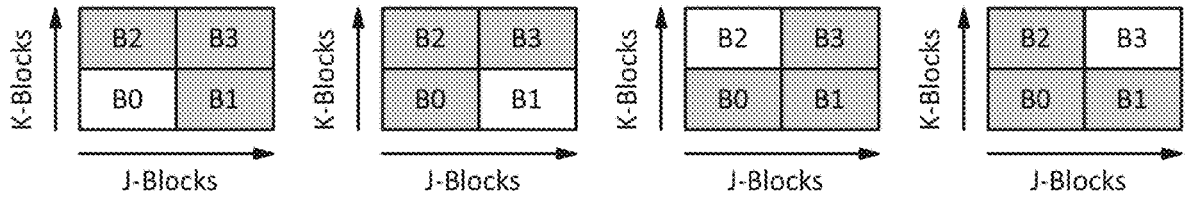

In the examples of FIG. 4H, each 2×2 input array may have three covered blocks. In any of these situations, the order of scheduling may not matter as it may require two 2-blocks arrays over two cycles (for example, as shown in FIG. 4A) regardless of the alignment of the covered blocks. In some embodiments, a scheduler may default to dispatching blocks with horizontal alignment (e.g., B0 and B1 followed by B2 and B3).

Figure 4I:
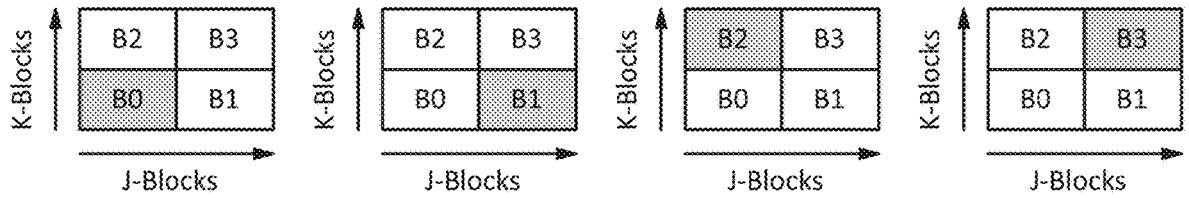

In the examples of FIG. 4I, each 2×2 input array may have a single covered block. In any of these cases, the single covered block may be scheduled over a single cycle in a single 2-block output array, regardless of the location of the covered block in the input arrays, and regardless of the 2×1 or 1×2 alignment of the output arrays.

Figure 5:
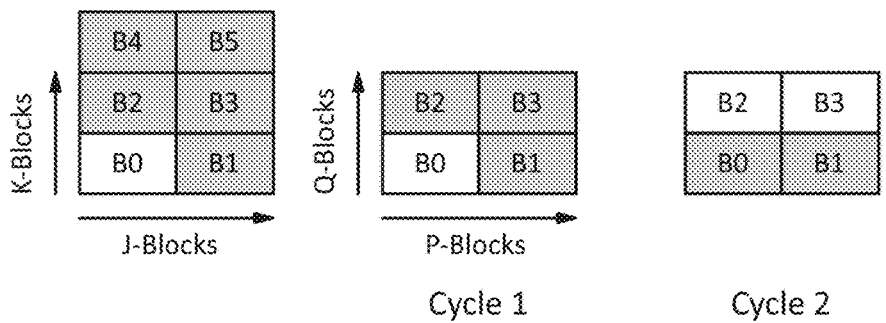
FIG. 5 illustrates another example embodiment of a scheduling process according to this disclosure.

FIG. 5 illustrates another example embodiment of a scheduling process according to this disclosure in which J×K=2×3. N=4, and P×Q=2×2. In this case, with five covered blocks in the input array, the spatially adjacent blocks may be scheduled in two 2×2 output arrays over two cycles.

Figure 6:
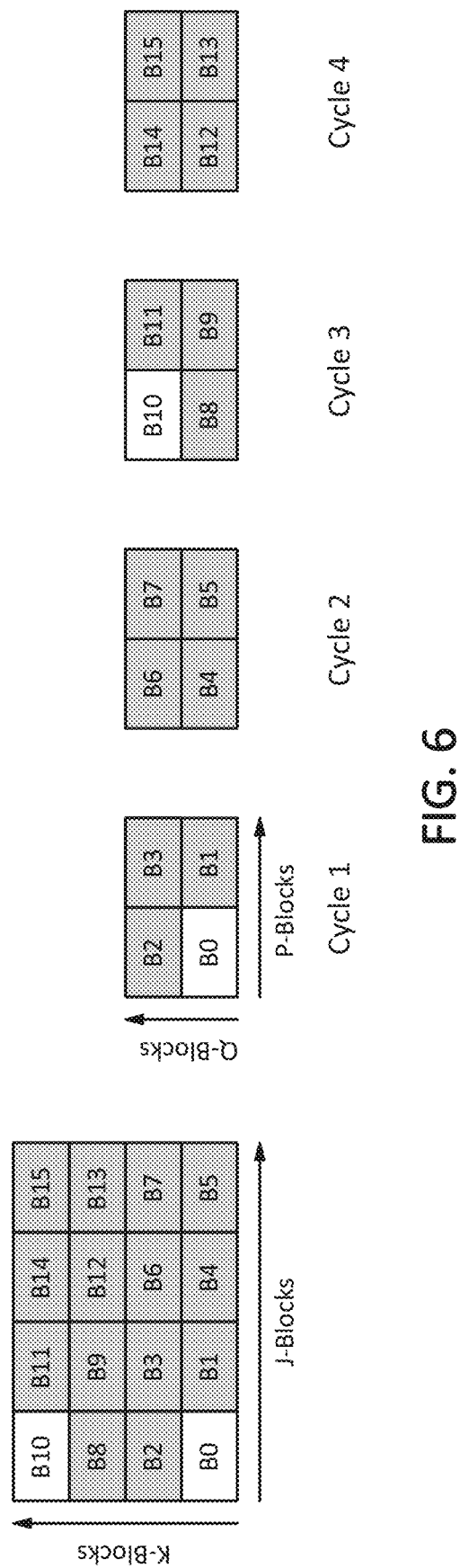
FIG. 6 illustrates another example embodiment of a scheduling process according to this disclosure.

FIG. 6 illustrates another example embodiment of a scheduling process according to this disclosure in which J×K=4×4, N=4, and P×Q=2×2. In this case, with 14 covered blocks in the input array, the spatially adjacent blocks may be scheduled in four 2×2 output arrays over four cycles.

Multi-Block Range Interpolation

In some embodiments, an attribute for a planar two-dimensional surface may be interpolated based on a plane equation having the form $$P(x,y)=A*(x-\text{Seed\_}X)+B*(y-\text{Seed\_}Y)+C \qquad \text{(Eq. 1)}$$

where P may be a parameter, or attribute, of a two-dimensional surface which may be interpolated at each location (x, y), x may be a distance in the X-direction, y may be a distance in the Y-direction, A may be a gradient per pixel (or other element) in the X-direction. B may be a gradient per pixel (or other element) in the Y-direction, and C may be a value of P at a root location (Seed_X, Seed_Y).

Interpolating values using the plane equation (Eq. 1) may require signed multiplication and signed addition, both of which may be costly in terms of power and area, and which may also be time-consuming. Some of the inventive principles of this disclosure may exploit the spatial locality (e.g., lateral adjacency (horizontal and/or vertical) and/or diagonal adjacency) of blocks sent by the scheduler, which may simplify and/or reduce the cost of an interpolation process and/or apparatus, as well as possibly improving other metrics. For example, a minimum value calculated for one block may be reused as a maximum value for an adjacent block, which may reduce the total number of calculations needed to interpolate an array of blocks.

All Corner Interpolation

Some of the inventive principles of this disclosure relate to the principle that a planar surface parameter may only have minimum and maximum values at the corners of a rectangle. Thus, the minimum and maximum values of a planar attribute over a single rectangular block may found by interpolating the values at the four corners, and then sorting the four values to find the minimum and maximum values. Moreover, this principle may be implemented with arrays having multiple adjacent blocks, which may reduce the number of calculations required to find the minimum and maximum values for each block. For example, the total number of corners that may be interpolated for a P×Q array may be (P+1)*(Q+1). This may represent a reduction from the P*Q*4 values that may need to be calculated if each block is interpolated separately.

Figure 7:
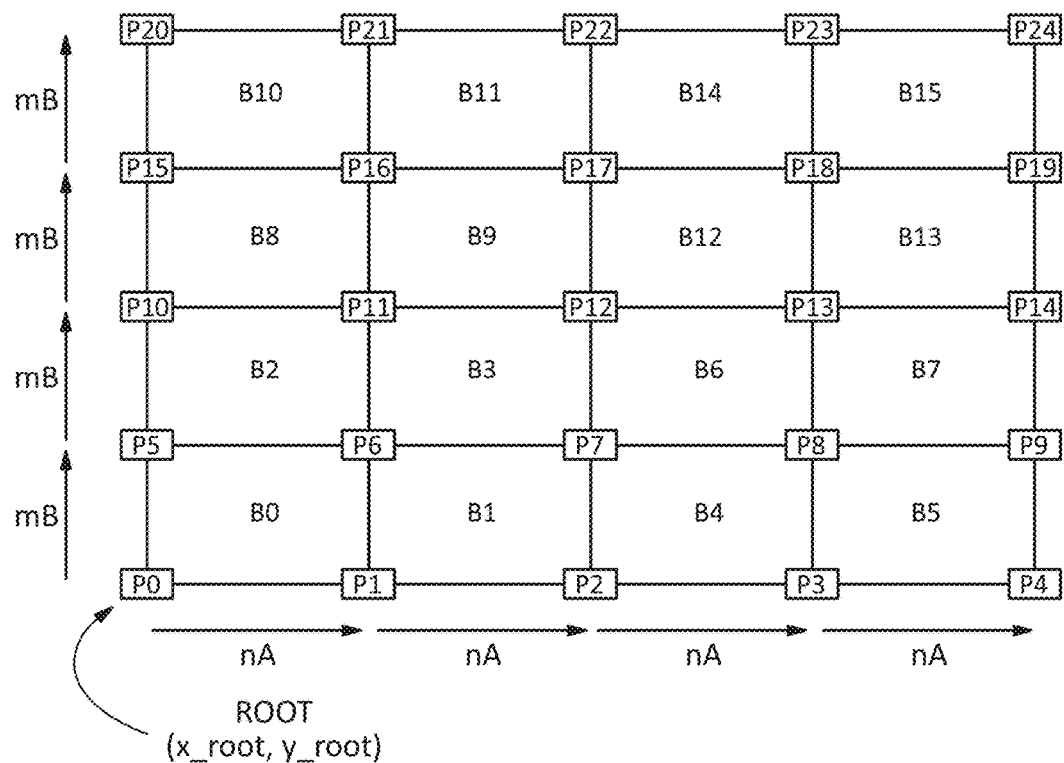
FIG. 7 illustrates an example embodiment of an all-corner interpolation technique for an array of blocks according to this disclosure.

FIG. 7 illustrates an example embodiment of an all-corner interpolation technique for an array of blocks according to this disclosure. In this example, the input array to the interpolator has dimensions P×Q=4×4. The interpolation process may begin by performing a full-range calculation using the plane equation (Eq. 1) to determine a root value of the attribute (ROOT) at a root location (x_root, y_root) at the lower left corner of the lower left block (Block B0) of the array. This calculation may use relatively expensive full-range signed multiplication and addition operations, but it may only need to be performed once per output array.

The values of the attribute at the other corners of the blocks may be calculated by adding incremental values, or deltas, which may be calculated as intermediate results using the gradients A and B of the plane equation, to the root value based on the vertical and/or horizontal offset of each corner from the root location.

Referring to FIG. 7, the value at point P1 may be calculated by adding the delta nA to ROOT, where n is the number of pixels per block in the X-direction. (The addition may be performed as a subtraction if the gradient A is negative in the X-direction.) The value of nA may be interpreted as the change in the value of the attribute P when traversing a distance of n pixels in the X-direction. Likewise, the value at point P5 may be calculated by adding the delta mB to ROOT, where m is the number of pixels per block in the Y-direction.

The calculations may become more complicated and/or expensive at corners further from the root. For example, the value at point P6 may be calculated by adding the delta (nA+mB) to ROOT. As additional examples, the values at points P2 and P3 may be calculate by adding 2 nA and 3 nA, respectively, to ROOT.

Therefore, to interpolate the values of the attribute at all points (all corners) of a generalized P×Q array of blocks, values may be calculated for the deltas nA, 2 nA, 3 nA, 4 nA, 5nA, . . . . PnA in the X-direction and mB, 2mB, 3mB, 4mB, 5mB, . . . , PmB in the Y-direction. The final delta at any corner may be found by adding the deltas in X- and Y-directions.

In some implementations, 2 nA, 2nB, 4 nA, 4nB, etc., may be calculated using a low-cost power-of-two ($2^N$) multiplier (i.e., 2, 4, etc.) in any data format. A low-cost $2^N$ multiplier for fixed point numbers may be implemented, for example, by shifting the number left by N bits. A low-cost $2^N$ multiplier for floating point numbers may be implemented, for example, by incrementing an exponent by log 2(N).

Table 1 illustrates example pseudo code for implementing a low-cost 32-bit floating point (FP32) $2^N$ multiplier for finding nA=N (pixels)*A with FP32. Similar logic may be used to find mB=M (pixels)*B with FP32. The pseudo code may also provide maximum positive and maximum negative cap off to avoid roll over to ± infinity.

TABLE 1

| 1 | a_is_zero_or_denorm | = (A[30:23]==8'h00); |
|---|---|---|
| 2 | na___ovrflw, na___exponent | = ({A[30:23]} + log_base2(N) ); |
| 3 | na_exponent_final | = (na_ovrflw \| (na_exponent==8'hff)) ? |
| 4 | | 8'hfe : na_exponent; |
| 5 | na_significand_final | = (na_ovrflw \| (na_exponent==8'hff)) ? |
| 6 | | 23'h7f_ffff : A[22:0]; |
| 7 | na | = {A[31], (a_is_zero_or_denorm ? {31'd0} : |
| 8 | | {na_exponent_final, na_significand_final})}; |

In some implementations, additional adders may be used to derive the values 3 nA, 5nA, 3mB, 5mB, etc., from the values 2 nA, 2nB, 4 nA, 4nB, etc.

After values of the attribute for all corners of the array are calculated, the four values for each block may be sorted to find the minimum and maximum values. In some embodiments, sorting may be implemented with 4*P*Q comparators, that is, four comparators per block. A multiplexer may also be used to select the minimum and maximum values from the four options for each block.

Figure 8:
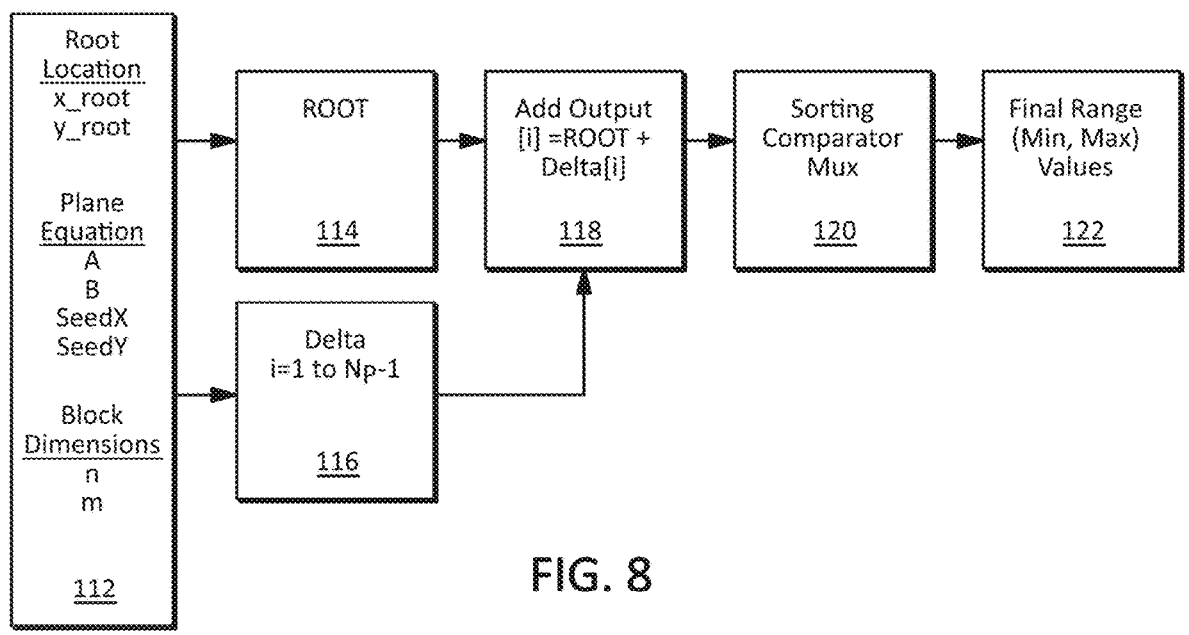
FIG. 8 illustrates an example embodiment of an all-corner interpolation system according to this disclosure.

FIG. 8 illustrates an example embodiment of an all-corner interpolation system according to this disclosure. The system of FIG. 8 may include a root unit 114 configured to calculate the root value of an attribute ROOT at a root location (x_root, y_root), in response to inputs 112, which may include any or all of the parameters of the plane equation (Eq. 1) along with n (the number of pixels per block in the X-direction) and m (the number of pixels per block in the Y-direction.) The root unit 114 may calculate ROOT, for example, through interpolation using full-scale and/or general-purpose multipliers, adders, and the like. A delta unit 116 may be configured to pre-calculate the deltas used to derive the values of the attribute at the other points (corners) of the array of blocks. The number of deltas may be given by $N_P-1$ where $N_P=(P+1)*(Q+1)$. An adder unit 118 may pass through the value ROOT, and calculate the final values of the attribute at each point other than the root location, by adding the deltas to ROOT. A sorting comparator and multiplexer unit 120 may select the minimum and maximum interpolated values for each block which are provided as outputs 122.

Selective Direction Interpolation

Some of the inventive principles of this disclosure involve exploiting a directional aspect of an attribute to reduce the number of calculations performed for each block. For example, an attribute based on a plane equation may have a directional gradient that may constrain the minimum and maximum values to diagonally opposite corners of a rectangle over which the attribute is interpolated.

Figure 9:
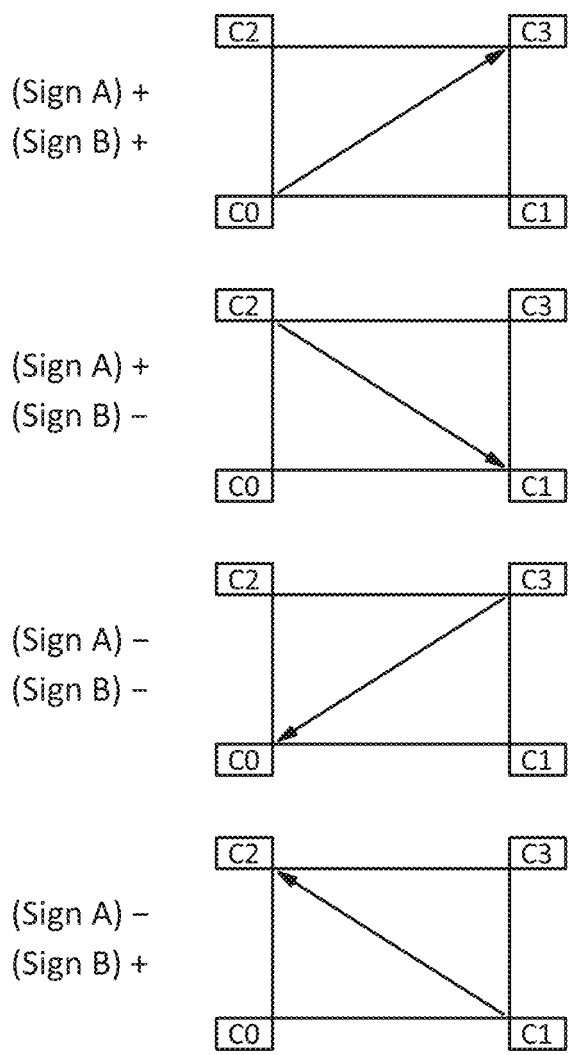
FIG. 9 illustrates some example blocks showing the locations of the minimum and maximum interpolated values of a planar attribute according to this disclosure.

FIG. 9 illustrates some example blocks showing the locations of the minimum and maximum interpolated values of a planar attribute according to this disclosure for various signs of the gradient per pixel A in the X-direction and B in the Y-direction. C0-C3 may indicate the four corners of each block. The head of each arrow may point to the corner having the maximum value, while the tail of each arrow may be located at the corner having the minimum value. For example, when A and B both have a positive sign, the minimum value may be located at the lower left corner (C0), and the maximum value may be located at the upper right corner (C3).

Thus, the number of values that need to be interpolated for a single block may be reduced from four to two. Accordingly, this may reduce the cost of sorting and/or selecting the minimum and maximum values in terms of energy, area, and/or other metrics. For example, in some implementations, sorting comparators may not be needed, and the final minimum and maximum values may be provided by one 2-to-1 multiplexer per value, per block.

Figure 10:
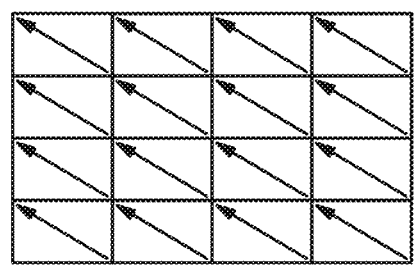
FIG. 10 illustrates directional gradients for a planar attribute according to this disclosure.

The selective direction approach may be implemented with multiple adjacent blocks as shown in FIG. 10 which illustrates directional gradients as arrows for each block in a P×Q array of blocks interpolated with planar attribute. In the example of FIG. 10, the gradients A and B may have the signs (A=negative. B=positive), and thus, the arrows may point upward and to the left. The arrows may point in other directions as shown in FIG. 9 for other combinations of the signs of A and B. Because the gradient direction may be the same for multiple blocks in the same primitive, the diagonal direction for each block may be the same for each block in the array. That is, the diagonal direction may be unidirectional and parallel for an entire array that is interpolated based on a plane equation.

Figure 11:
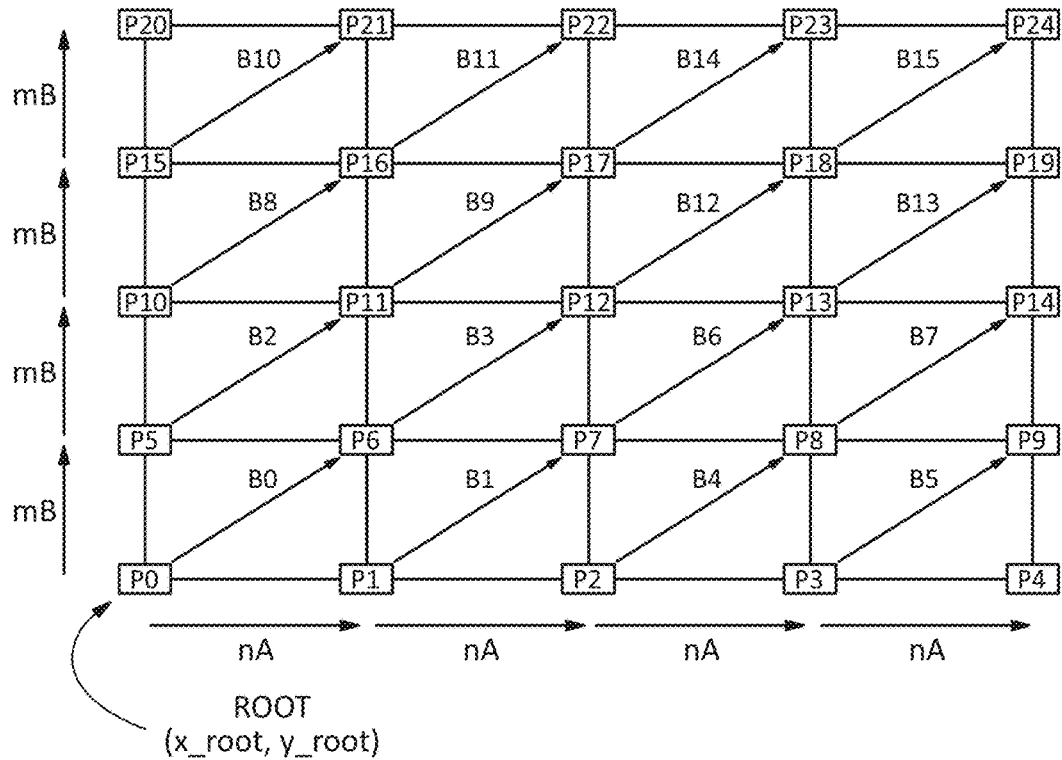
FIG. 11 illustrates an example embodiment of a selective directional interpolation technique for an array of blocks according to this disclosure.

FIG. 11 illustrates an example embodiment of a selective directional interpolation technique for an array of blocks according to this disclosure. In this example, the input array to the interpolator has dimensions P×Q=4×4. The gradients A and B may both be positive, and therefore, the arrows indicating the minimum and maximum corners for each block may point from lower left to upper right. The interpolation process may begin in a similar manner to that described above with respect to the embodiment of FIG. 7. That is, a full-range calculation may be performed using the plane equation (Eq. 1) to determine the root value ROOT at root location (x_root, y_root) located at the lower left corner of the lower left block (Block 0) of the array. The values of the attribute at other points (corners) of the blocks may be calculated by adding deltas that may be calculated as described above with respect to the embodiment of FIG. 7.

However, the values of the attribute may not need to be interpolated at every corner of every block. For example, referring to FIG. 11, the values at points P4 and P20, which may be located at the lower right and upper left corners of the array, respectively, may not need to be calculated. Moreover, the final minimum and maximum interpolated values for each block may be provided by two 2-to-1 multiplexers per block—one for the minimum value and one for the maximum value.

Figure 12:
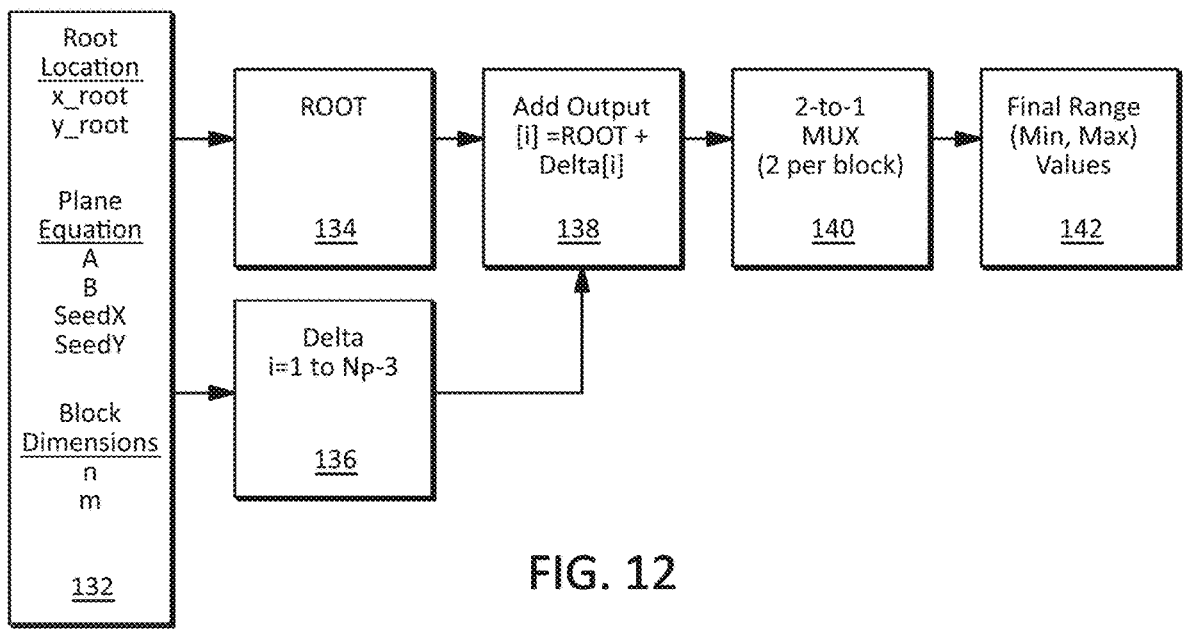
FIG. 12 illustrates an example embodiment of a selective direction interpolation system according to this disclosure.

FIG. 12 illustrates an example embodiment of a selective direction interpolation system according to this disclosure. The system of FIG. 12 may include a root unit 134 configured to calculate the root value of an attribute ROOT at a root location (x_root, y_root), in response to inputs 132, which may include any or all of the parameters of the plane equation (Eq. 1) along with n (the number of pixels per block in the X-direction) and m (the number of pixels per block in the Y-direction.) The root unit 134 may calculate ROOT, for example, through interpolation using full-scale and/or general-purpose multipliers, adders, and the like. A delta unit 136 may be configured to pre-calculate the deltas used to derive the values of the attribute at the other points (corners) of the array of blocks. The number of deltas may be given by $N_P-3$ where $N_P=(P+1)*(Q+1)$. An adder unit 138 may pass through the value ROOT, and calculate the final values of the attribute at each two diagonally opposite points for each block (other than the root location) by adding the deltas to ROOT. A multiplexer unit 140 may select the minimum and maximum interpolated values for each block which are provided as outputs 142.

Diagonal Hierarchical Interpolation

Some additional inventive principles of this disclosure relate to interpolating to the center of an array of blocks, and then calculating the values at other required points based on spatial offsets from the center that may be both positive and negative. For example, in some embodiments, by calculating the root value of a planar attribute at the center of a 2×2 array of blocks, the value at six other corners may be calculated by adding various combinations of only four deltas (incremental values) nA, mB, and nA±mB to the root value.

Figure 13:
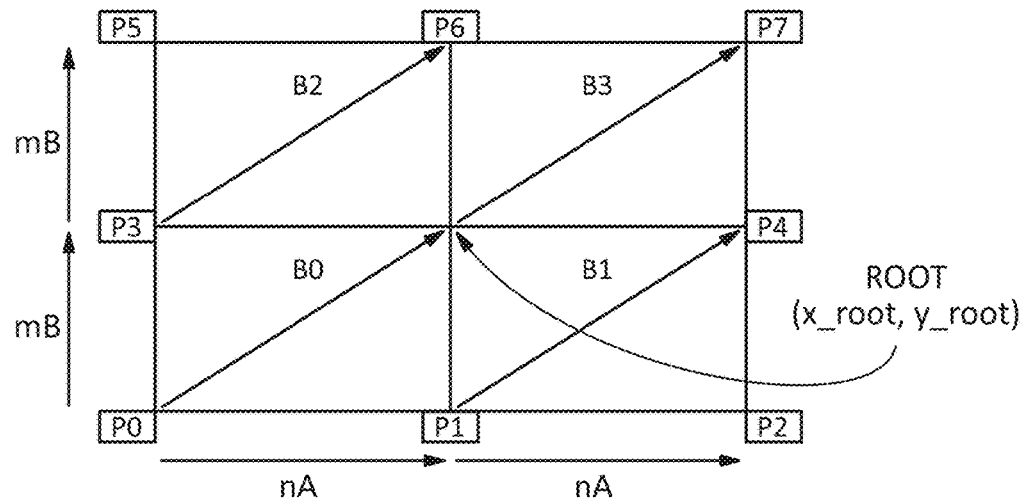
FIG. 13 illustrates an example embodiment of an interpolation technique with a central root location according to this disclosure.

FIG. 13 illustrates an example embodiment of an interpolation technique with a central root location according to this disclosure. In this example, the input array to the interpolator has dimensions P×Q=2×2. The gradients A and B may both be positive, and therefore, the arrows indicating the minimum and maximum corners for each block may point from lower left to upper right. (An embodiment in which A and B are both negative may be similar but with the head and tail of each arrow reversed.)

Figure 14:
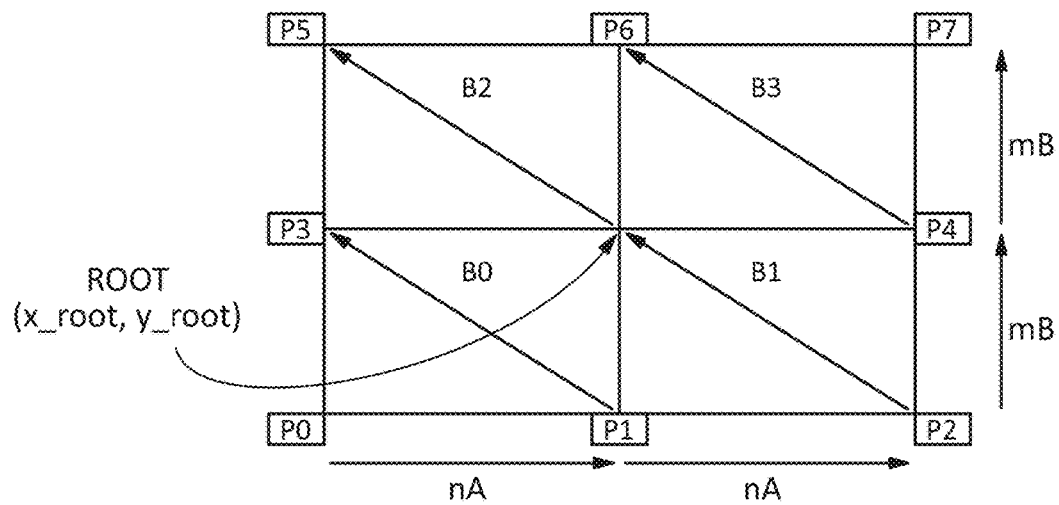
FIG. 14 illustrates another example embodiment of an interpolation technique with a central root location according to this disclosure.

The interpolation process may begin by performing a full-range calculation using the plane equation (Eq. 1) to determine a root value of the attribute (ROOT) at the root location (x_root, y_root) at the center of the 2×2 array which may also be a corner of all four blocks B0, B1, B2, and B3. Because this embodiment may take advantage of the selective direction principles, values may only need to be interpolated for two diagonally opposed corners per block. However, because the array may include spatially adjacent covered blocks, some values for some blocks may be reused for other blocks. Thus, the planar attribute may only need to be interpolated at six other points by adding deltas to the root value as follows:

$P0=\text{ROOT}-(nA+mB)$ $P1=\text{ROOT}-(mB)$ $P3=\text{ROOT}-(nA)$ $P4=\text{ROOT}+(nA)$ $P6=\text{ROOT}+(mB)$ $P7=\text{ROOT}+(nA+mB)$ FIG. 14 illustrates another example embodiment of an interpolation technique with a central root location according to this disclosure. The embodiment of FIG. 14 may be similar to that of FIG. 13, but with the gradient A being negative and the gradient B being positive. Thus, the arrows indicating the minimum and maximum corners for each block may point from lower right to upper left. (An embodiment in which A is positive and is B negative may be similar but with the head and tail of each arrow reversed.)

As with the embodiment of FIG. 13, the interpolation process may begin by using the plane equation (Eq. 1) to determine a root value of the attribute (ROOT) at the root location (x_root, y_root) which may be located at the center of the array. Because this embodiment may also utilize the principles of selective direction and adjacent blocks, the planar attribute may only need to be interpolated at six other points by adding deltas to the root value as follows:

$P1=\text{ROOT}-(mB)$ $P2=\text{ROOT}+(nA-mB)$ $P3=\text{ROOT}-(nA)$ $P4=\text{ROOT}+(nA)$ $P5=\text{ROOT}-(nA-mB)$ $P6=\text{ROOT}+(mB)$ In some embodiments, the interpolated value at a central root location may always be one of the minimum or maximum values that may be used directly without any intermediate unused values being calculated, as may be apparent from the P×Q=2×2 arrays illustrated in FIGS. 13 and 14. This principle may also be helpful in embodiments in which P or Q may have an odd value. For example, in an embodiment in which the interpolator has a 2×1 or 1×2 configuration, two horizontally or vertically aligned blocks may be interpolated per cycle to interpolate a 2×2 array. Regardless of the diagonal direction (indicated by the diagonal arrows based on the signs of A and B), the root value may be at least one of the minimum or maximum values for the two blocks that are transferred each cycle. Thus the root value ROOT may be reused for multiple cycles, which may therefor improve power efficiency.

Figure 15:
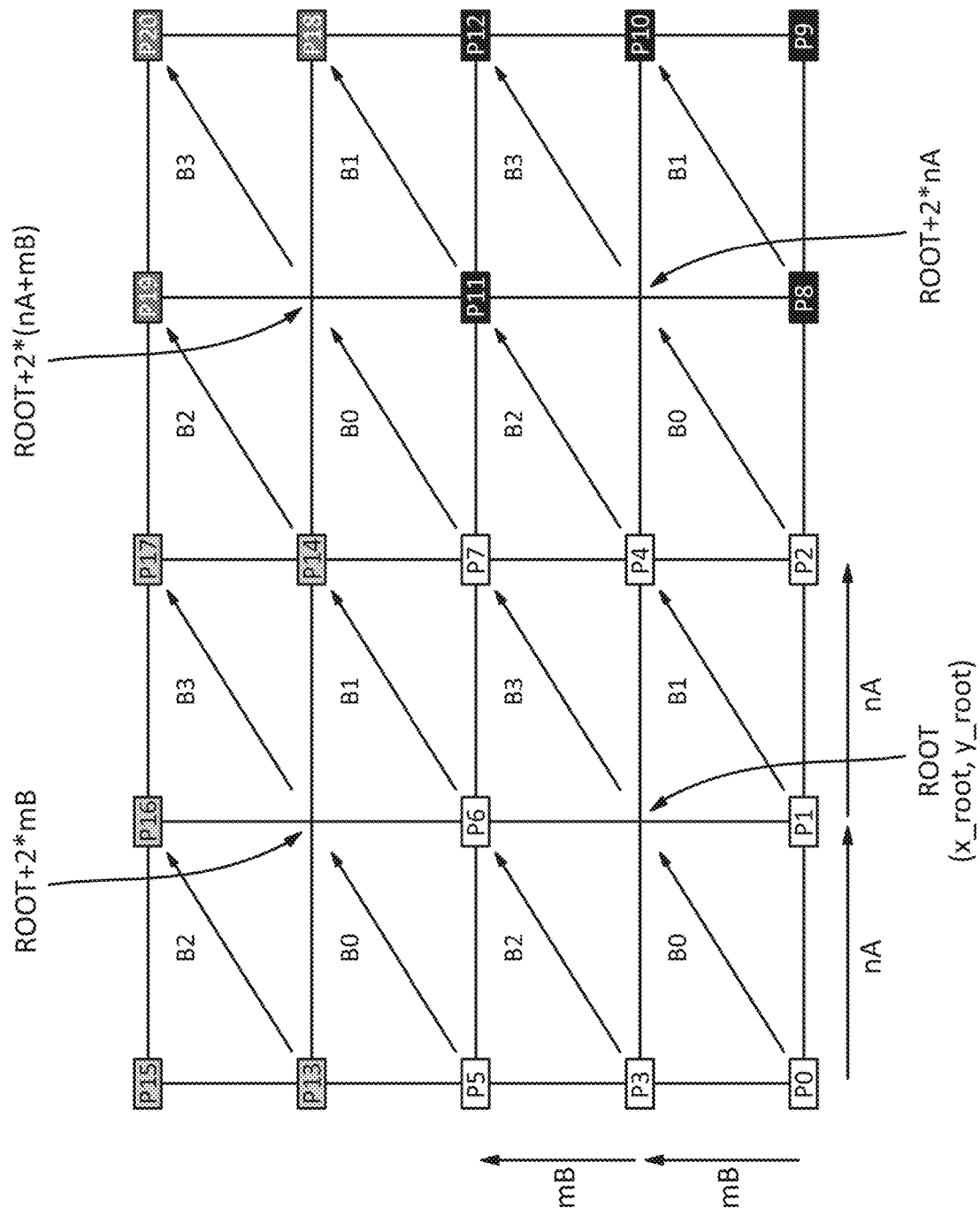
FIG. 15 illustrates an example embodiment of a 4×4 array of blocks divided into four 2×2 arrays according to this disclosure.

Some additional inventive principles of this disclosure relate to hierarchical scaling arrangements of smaller arrays of blocks to interpolate larger arrays of blocks. For example, a 4×4 array of blocks may be divided into four 2×2 arrays, each of which may have a centrally located root as illustrated in FIG. 15. In the embodiment of FIG. 15, the interpolation process may begin by performing a full-range calculation using the plane equation (Eq. 1) to determine a root value ROOT0 of the attribute at the central root location (x_root, y_root) for the lower left 2×2 array. The root values ROOT1, ROOT2, and ROOT3 at the centers of the other 2×2 arrays may then be interpolated by calculating the intermediate values 2 nA, 2mB, and 2*(nA+mB), for example, using low-cost multipliers as described above, and adding these intermediate values to ROOT0.

The remaining values in each 2×2 subarray may be interpolated together in sets based on the location of the subarray within the larger 4×4 array, as well as the direction of the planar gradient (i.e., the signs of the planar gradients A and B). In general, P0-P20 may be a set of all 21 points that may need to be interpolated from the root values ROOT0, ROOT1, ROOT2, and ROOT3. However, for any given gradient direction, only 19 of the points may need to be interpolated. In the example shown in FIGS. 15. A and B are both positive, and therefore, the values at P9 and P15 may not need to be calculated, as they may not be minimum or maximum values for their respective blocks. Likewise, if both A and B are negative, P9 and P15 may not need to be calculated. In contrast, if either of A or B is positive, and the other is negative, the values at P0 and P20 may not need to be calculated.

In the example of FIG. 15, the remaining values in each 2×2 subarray may be interpolated together in sets as follows:
SET0: points {P0-P7}
SET1: points {P8-P12}
SET2: points {P13-P17}
SET3: points {P18-P20}

For the points in SET0, the values may be calculated as follows:

$P0=ROOT0-(nA+mB)$ $P1=ROOT0-(mB)$ $P2=ROOT0+(nA-mB)$ $P3=ROOT0-(nA)$ $P4=ROOT0+(nA)$ $P5=ROOT0-(nA-mB)$ $P6=ROOT0+(mB)$ $P7=ROOT0+(nA+mB)$

For points in SET1, the values may be calculated as follows:

$P8=ROOT1-(mB)$ $P9=ROOT1+(nA-mB)$ $P10=ROOT1+(nA)$ $P11=ROOT1+(mB)$ $P12=ROOT1+(nA+mB)$

For points in SET2, the values may be calculated as follows:

$P13=ROOT2-(nA)$ $P14=ROOT2+(nA)$ $P15=ROOT2-(nA-mB)$ $P16=ROOT2+(mB)$ $P17=ROOT2+(nA+mB)$

For points in SET3, the values may be calculated as follows:

$P18=ROOT3+(nA)$ $P19=ROOT3+(mB)$ $P20=ROOT3+(nA+mB)$

Thus, in some embodiments, to interpolate ranges for an entire 4×4 array of blocks divided into 2×2 subarrays, after finding the first root value ROOT0, the remaining root values ROOT1. ROOT2, and ROOT3 may be calculated by adding just 2 nA, 2mB, and 2*(nA+mB) to ROOT0, and values at the remaining points P0-P20 may be calculated by adding just nA, mB, and (nA±mB) to the four root values.

A hierarchical scaling embodiment such as the 2×2 approach may add a serialization for 2×2 arrays that are not in the left bottom corner of a 4×4 array. In some embodiments, a tree approach may be used to remove this bias by interpolating the value at the center 2×2 array and deriving the values of the remaining points from there. Calculating the values of the deltas for this approach may more efficient than for those required for the all-corner embodiment of FIG. 7 or the selective direction of FIG. 11, which may have more odd intermediate values, with lesser probability of re-use compared to a hierarchical 2×2 approach. For example intermediate values such as 3 nA, 3mB, 2 nA+mB, 2mB+nA, 3 nA+mB, nA+3mB, 2 nA+3mB, etc., may be location specific, and therefore, energy spent computing them may be less efficient.

In some embodiments, the principles of this disclosure, including those relating to hierarchical scaling such as 2×2 scaling, may be applied to other interpolation processes such as rasterization, which may be implemented as a process for finding coverage of a primitive in an image. For example, in some embodiments, a rasterization process may interpolate distances from edges for a matrix output (e.g., 4×4, 8×8, or 16×16 arrays of pixels) based on an edge equation in which deltas may be pre-computed as dx, dy, dx+dy, and dx−dy where dx may be the delta based on the gradient in the X-direction and dy may be the delta based on the gradient in the Y-direction. Such an embodiment may be implemented, for example, for rasterization in a graphics processing unit (GPU). Depending on the implementation details, the principles of this disclosure may reduce the per-pixel (or per-sample) cost of interpolation.

Figure 16:
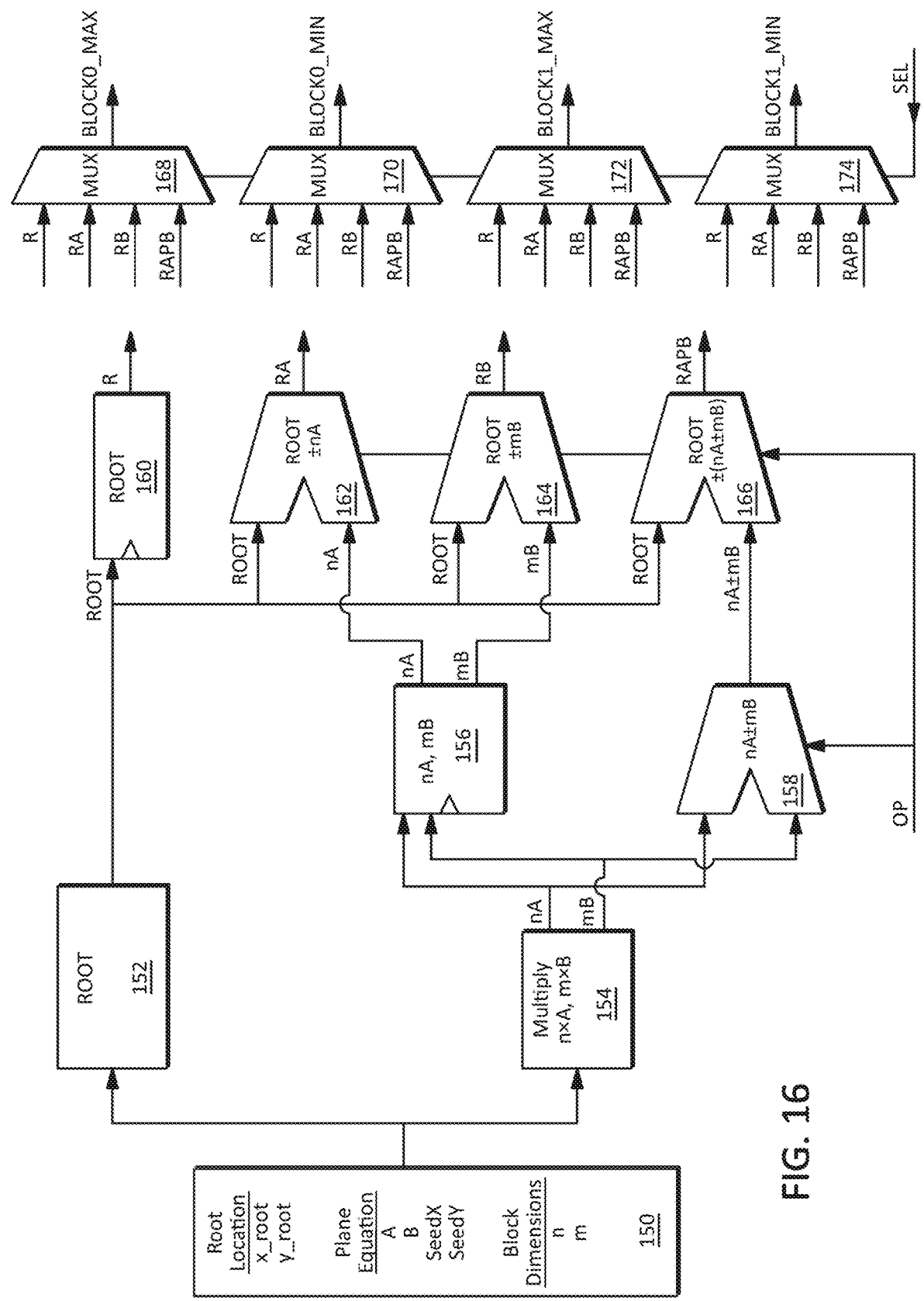
FIG. 16 is a block diagram of a micro-architecture illustrating structure and dataflow for an example embodiment of a diagonal hierarchical interpolation system according to this disclosure.

FIG. 16 is a block diagram of a micro-architecture illustrating structure and dataflow for an example embodiment of a diagonal hierarchical interpolation system according to the principles of this disclosure. The system of FIG. 16 may be used, for example, to implement multi-block range interpolation in which P×Q=2×1 or 1×2 as described above. Some example implementation details are provided below, but the principles are not limited to any of the example details described in this disclosure.

The system of FIG. 16 may include a root unit 152 configured to calculate the root value ROOT of an attribute at a root location (x_root, y_root), in response to inputs 150, which may include any or all of the parameters of the plane equation (Eq. 1) along with n (the number of pixels per block in the X-direction) and m (the number of pixels per block in the Y-direction.) The root unit 152 may calculate ROOT, for example, through interpolation using full-scale and/or general-purpose multipliers, adders, and the like. The root unit 152 may output the value ROOT to a register 160 where it may be selected as a final minimum or maximum value for a block. In other embodiments, the register 160 may be replaced, or used in conjunction, with a buffer and/or other element.

A multiplier 154 may calculate the values nA and mB which may be output to a register 156 and an adder 158. The multiplier may be implemented, for example, as a low-cost multiplier such as one of those described above. The values nA and mB may be stored in a register 156 for use as deltas in addition operations to calculate final interpolation values. The register 156 may be implemented, for example, with a first-in, first-out (FIFO) register. The adder 158 may calculate the value nA±mB for use as a delta in an addition operation to calculate a final interpolation value. The sign of the ± operation (i.e., whether B is added to, or subtracted from, A) may be determined by the signal OP based on the direction of the planar gradient. In some embodiments, the register 156 may be replaced, or used in conjunction, with a first-in, first-out (FIFO) buffer and/or other element.

An adder 162 may be configured to calculate ROOT±nA, which may be referred to as RA and may be selected as a final minimum or maximum value for a block. Another adder 164 may be configured to calculate ROOT±mB, which may be referred to as RB and may be selected as a final minimum or maximum value for a block. An additional adder 166 may be configured to calculate ROOT±(nA±mB) which may be referred to as RAPB and may be selected as a final minimum or maximum value for a block. The sign of the ± operation in adders 162, 164, and 166 may be determined by the signal OP based on the direction of the planar gradient.

Thus, the outputs of register 160 and adders 162, 164, and 166 may provide all four of the interpolated values (ROOT, RA=ROOT±nA, RB=ROOT±mB, and RAPB=ROOT±(nA±mB)) that may be needed to determine a minimum/maximum range for each of two adjacent blocks in a 2×1 or 1×2 multi-block interpolator. Four 4-to-1 multiplexers or selectors may be arranged to each receive all four of the interpolated values ROOT, RA, RB, and RAPB and select the minimum and maximum values for specific blocks in response to a source select signal SEL based on the direction of the planar gradient. Specifically, multiplexer 168 may select the maximum value for Block 0, multiplexer 170 may select the minimum value for Block 0, multiplexer 172 may select the maximum value for Block 1, and multiplexer 174 may select the minimum value for Block 1.

Figure 17:
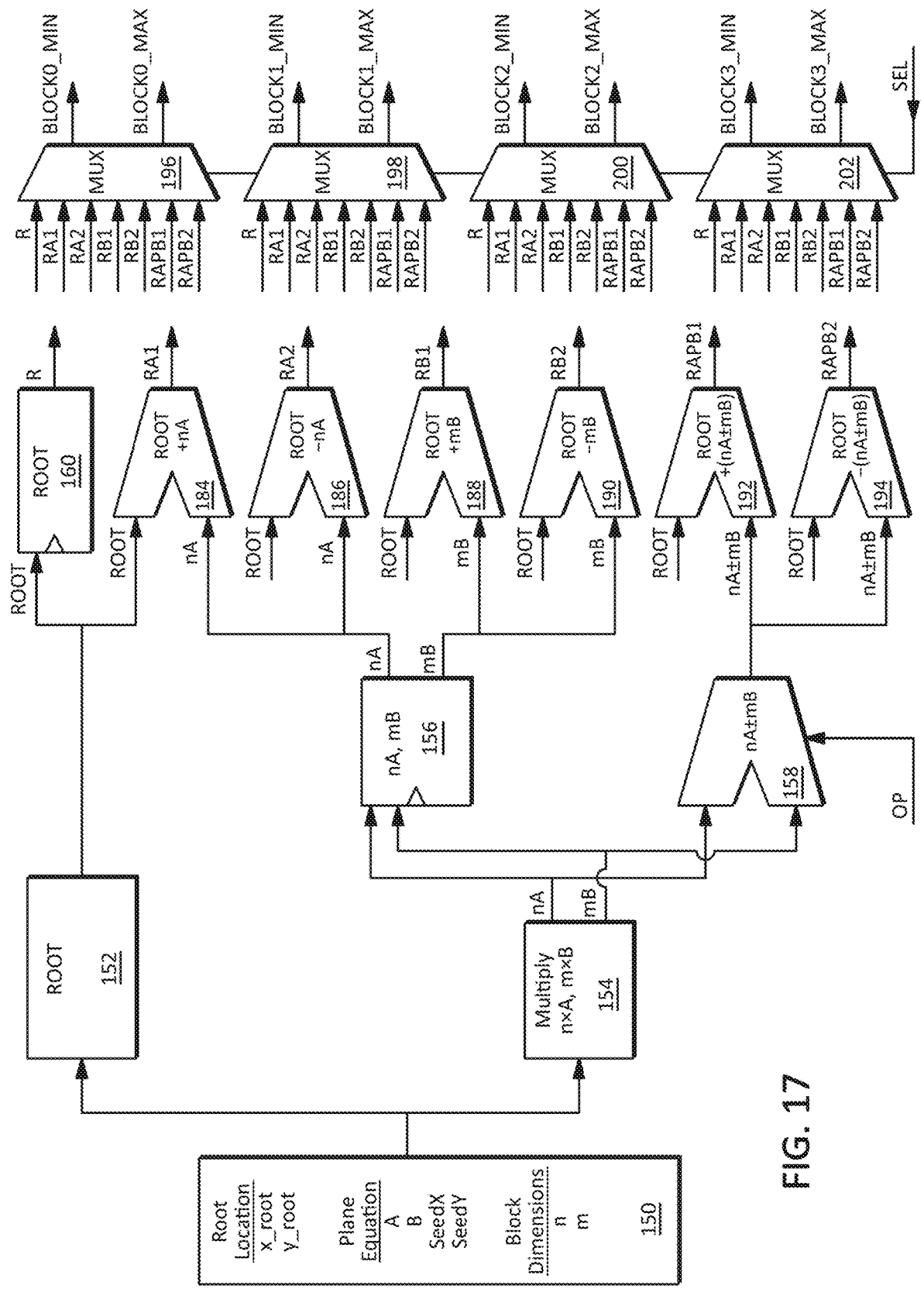
FIG. 17 is a block diagram of a micro-architecture illustrating structure and dataflow for another example embodiment of a diagonal hierarchical interpolation system according to this disclosure.

FIG. 17 is a block diagram of a micro-architecture illustrating structure and dataflow for another example embodiment of a diagonal hierarchical interpolation system according to the principles of this disclosure. The system of FIG. 17 may be used, for example, to implement multi-block range interpolation in which P×Q=2×2 as described above with respect to FIGS. 13 and 14. Some example implementation details are provided below, but the principles are not limited to any of the example details described in this disclosure.

The system of FIG. 17 may include a root unit 152, multiplier 154, register 156, and adder 158 configured to calculate the root value ROOT and the deltas ROOT±nA, ROOT±mB, and ROOT±(nA±mB) in a manner similar to the corresponding components having the same reference numbers in FIG. 16. A register 160 to provide the value ROOT may also be similar to the embodiment of FIG. 16. In other embodiments, the register 160 may be replaced, or used in conjunction, with a buffer and/or other element. In some embodiments, the register 156 may be replaced, or used in conjunction, with a first-in, first-out (FIFO) buffer and/or other element. The adder 158 may calculate the value nA±mB for use as a delta in an addition operation to calculate a final interpolation value. The sign of the t operation (i.e., whether mB is added to, or subtracted from, nA) may be determined by the signal OP based on the direction of the planar gradient.

In the embodiment of FIG. 17, however, additional adders may be included to provide a total of seven interpolated values that may be needed to determine a minimum/maximum range for each of four adjacent blocks in a 2×2 multi-block interpolator as described above with respect to FIGS. 13 and 14. Specifically, adders 184, 186, 188, 190, 192, and 194 may be configured to provide the following outputs, respectively:

$$RA1 = ROOT + nA$$

$$RA2 = ROOT - nA$$

$$RB1 = ROOT + mB$$

$$RB2 = ROOT - mB$$

$$RAPB1 = ROOT + (nA \pm mB)$$

$$RAPB2 = ROOT - (nA \pm mB)$$

Four 7-to-2 multiplexers or selectors may be arranged to each receive all seven of the interpolated values ROOT, RA1, RA2, RB1, RB2, RAPB1, and RAPB2, and select the minimum and maximum values for specific blocks in response to a source select signal SEL 15 based on the direction of the planar gradient. Specifically, multiplexer 196 may select the minimum and maximum values for Block 0, multiplexer 198 may select the minimum and maximum values for Block 1, multiplexer 200 may select the minimum and maximum values for Block 2, and multiplexer 202 may select the minimum and maximum values for Block 3.

Any of the example embodiments illustrated in FIGS. 8, 12, 16, and 17 may be implemented in hardware, software, or any combination thereof, using any suitable format for number values including floating point numbers of any precision, fixed point numbers of any precision, signed and unsigned integers of any length, unorm numbers of any length, etc.

Table 2 illustrates example pseudocode that may be suitable for manipulating the OP signal to control the t operations in the embodiment of FIG. 16, which may be based on a P×Q=2×1 or 1×2 multi-block interpolator. The pseudocode of Table 2, however, may be readily adapted to work with a P×Q=2×2 embodiment, or any combination of P×Q. In the pseudocode of Table 2, arb may refer to the output of a block scheduler algorithm, and ra, rb, and rapb may refer to the values RA, RB, and RAPB, respectively.

TABLE 2

```
1    if (sign_a^sign_b) op_apb = OP_SUB;
2      else op_apb = OP_ADD;
3      case (arb)
4        HORIZONTAL0 : {
5          if (sign_a^sign_b) {
6            op_ra         = OP_SUB;
7            op_rb         = OP_SUB;
8            op_rapb       = OP_ADD;
9          }
10         else {
11           op_ra         = OP_ADD;
12           op_rb         = OP_SUB;
13           op_rapb       = OP_SUB;
14         }
15       }
16       HORIZONTAL1 : {
17         if (sign_a^sign_b) {
18           op_ra         = OP_ADD;
19           op_rb         = OP_ADD;
20           op_rapb       = OP_SUB;
21         }
22         else {
23           op_ra         = OP_SUB;
24           op_rb         = OP_ADD;
25           op_rapb       = OP_ADD;
26         }
27       }
28       VERTICAL0 : {
29         if (sign_a^sign_b) {
30           op_ra         = OP_SUB;
31           op_rb         = OP_SUB;
32           op_rapb       = OP SUB;
33         }
34         else {
35           op_ra         = OP_SUB;
```

TABLE 2-continued

```
36           op_rb         = OP_ADD;
37           op_rapb       = OP_SUB;
38         }
39       }
40       VERTICAL1 : {
41         if (sign_a^sign_b) {
42           op_ra         = OP_ADD;
43           op_rb         = OP_ADD;
44           op_fapb       = OP_ADD;
45         }
46         else {
47           op_ra         = OP_ADD;
48           op_rb         = OP_SUB;
49           op_rapb       = OP_ADD;
50         }
51       }
52       default : {
53         op_ra           = OP_ADD;
54         op_rb           = OP_ADD;
55         op_rapb         = OP_ADD;
56       }
57     endcase
```

Table 3 illustrates example pseudocode that may be suitable for manipulating the SEL signal to select final minimum and maximum values in the embodiment of FIG. 16, which may be based on a P×Q=2×1 or 1×2 multi-block interpolator. The pseudocode of Table 3, however, may be readily adapted to work with a P×Q=2×2 embodiment, or any combination of P×Q. In the pseudocode of Table 3, arb may refer to the output of a block scheduler algorithm, and ROOT, ROOTA, ROOTB, and ROOTAPB may refer to the values RA, RB, and RAPB, respectively.

TABLE 3

```
1    unique case (arb)
2      HORIZONTAL0 : {
3        case ({sign_a,sign_b})
4          2'b00      : {
5                                block0_max_sel = SEL_ROOT;
6                                block0_min_sel = SEL_ROOTAPB;
7                                block1_max_sel = SEL_ROOTA;
8                                block1_min_sel = SEL_ROOTB;
9          }
10         2'b01      : {
11                               block0_max_sel = SEL_ROOTB;
12                               block0_min_sel = SEL_ROOTA;
13                               block1_max_sel = SEL_ROOTAPB;
14                               block1_min_sel = SEL_ROOT;
15         }
16         2'b10      : {
17                               block0_max_sel = SEL_ROOTA;
18                               block0_min_sel = SEL_ROOTB;
19                               block1_max_sel = SEL_ROOT;
20                               block1_min_sel = SEL_ROOTAPB;
21         }
22         2'b11      : {
23                               block0_max_sel = SEL_ROOTAPB;
24                               block0_min_sel = SEL_ROOT;
25                               block1_max_sel = SEL_ROOTB;
26                               block1_min_sel = SEL_ROOTA;
27         }
28         default    : {
29                               block0_max_sel = SEL_ROOT;
30                               block0_min_sel = SEL_ROOTAPB;
31                               block1_max_sel = SEL_ROOTA;
32                               block1_min_sel = SEL_ROOTB;
33         }
34       endcase
35     }
36     HORIZONTAL1  : {
37       unique case ({sign_a,sign_b})
38         2'b00      : {
39                               block0_max_sel = SEL_ROOTB;
40                               block0_min_sel = SEL_ROOTA;
```

TABLE 3-continued

```
41                                              block1_max_sel = SEL_ROOTAPB;
42                                              block1_min_sel = SEL_ROOT;
43                                          }
44                          2'b01     : {
45                                              block0_max_sel = SEL_ROOT;
46                                              block0_min_sel = SEL_ROOTAPB;
47                                              block1_max_sel = SEL_ROOTA;
48                                              block1_min_sel = SEL_ROOTB;
49                                          }
50                          2'b10     : {
51                                              block0_max_sel = SEL_ROOTAPB;
52                                              block0_min_sel = SEL_ROOT;
53                                              block1_max_sel = SEL_ROOTB;
54                                              block1_min_sel = SEL_ROOTA;
55                                          }
56                          2'b11     : {
57                                              block0_max_sel = SEL_ROOTA;
58                                              block0_min_sel = SEL_ROOTB;
59                                              block1_max_sel = SEL_ROOT;
60                                              block1_min_sel = SEL_ROOTAPB;
61                                          }
62                          default   : {
63                                              block0_max_sel = SEL_ROOT;
64                                              block0_min_sel = SEL ROOTAPB;
65                                              block1_max_sel = SEL_ROOTA;
66                                              block1_min_sel = SEL_ROOTB;
67                                          }
68                      endcase
69                  }
70   VERTICAL0    : {
71                      unique case ({sign_a,sign_b})
72                          2'b00     : {
73                                              block0_max_sel = SEL_ROOT;
74                                              block0_min_sel = SEL_ROOTAPB;
75                                              block1_max_sel = SEL_ROOTB;
76                                              block1_min_sel = SEL_ROOTA;
77                                          }
78                          2'b01     : {
79                                              block0_max_sel = SEL_ROOTB;
80                                              block0_min_sel = SEL_ROOTA;
81                                              block1_max_sel = SEL_ROOT;
82                                              block1_min_sel = SEL_ROOTAPB;
83                                          }
84                          2'b10     : {
85                                              block0_max_sel = SEL_ROOTA;
86                                              block0_min_sel = SEL_ROOTB;
87                                              block1_max_sel = SEL_ROOTAPB;
88                                              block1_min_sel = SEL_ROOT;
89                                          }
90                          2'b11     : {
91                                              block0_max_sel = SEL_ROOTAPB;
92                                              block0_min_sel = SEL_ROOT;
93                                              block1_max_sel = SEL_ROOTA;
94                                              block1_min_sel = SEL_ROOTB;
95                                          }
96                          default   : {
97                                              block0_max_sel = SEL_ROOT;
98                                              block0_min_sel = SEL_ROOTAPB;
99                                              block1_max_sel = SEL_ROOTA;
100                                             block1_min_sel = SEL_ROOTB;
101                                         }
102                     endcase
103                 }
104  VERTICAL1    : {
105                     unique case ({sign_a, sign_b})
106                         2'b00     : {
107                                             block0_max_sel = SEL_ROOTA;
108                                             block0_min_sel = SEL_ROOTB;
109                                             block1_max_sel = SEL_ROOTAPB;
110                                             block1_min_sel = SEL_ROOT;
111                                         }
112                         2'b01     : {
113                                             block0_max_sel = SEL_ROOTAPB;
114                                             block0_min_sel = SEL_ROOT;
115                                             block1_max_sel = SEL_ROOTA;
116                                             block1_min_sel = SEL_ROOTB;
117                                         }
118                         2'b10     : {
119                                             block0_max_sel = SEL_ROOT;
120                                             block0_min_sel = SEL_ROOTAPB;
```

TABLE 3-continued

```
121                                        block1_max_sel = SEL_ROOTB;
122                                        block1_min_sel = SEL_ROOTA;
123                                    }
124                        2'b11     : {
125                                        block0_max_sel = SEL_ROOTB;
126                                        block0_min_sel = SEL_ROOTA;
127                                        block1_max_sel = SEL_ROOT;
128                                        block1_min_sel = SEL_ROOTAPB;
129                                    }
130                        default   : {
131                                        block0_max_sel. = SEL_ROOT;
132                                        block0_min_sel = SEL_ROOTAPB;
133                                        block1_max_sel = SEL_ROOTA;
134                                        block1_min_sel = SEL_ROOTB;
135                                    }
136                    endcase
137                }
138     default         : {
139                    block0_max_sel = SEL_ROOT;
140                    block0_min_sel = SEL_ROOTAPB;
141                    block1_max_sel = SEL_ROOTA;
142                    block1_min_sel = SEL__ROOTB;
143                }
144     Endcase
```

Number Format Conversion

In some embodiments, it may be beneficial to convert interpolated values from a higher precision number format, which may be used during an interpolation operation, to a lower precision format for use by backend apparatus. For example 32-bit floating point numbers (FP32) may be used during interpolation, but it may be beneficial to use lower precision numbers such as 16-bit unorm for backend (downstream) apparatus to reduce the cost of the hardware (e.g., for comparison, rejection and/or computation, etc.) and/or to reduce the memory footprint and/or bandwidth that may be required for higher precision numbers.

Conventional techniques for converting floating point to unorm numbers may employ a "round-to-nearest" rounding strategy that rounds converted numbers to the nearest unorm value. In the context of interval-based arithmetic such as range interpolation, however, round-to-nearest rounding may result in converted minimum and maximum values that underrepresent the true minimum and maximum values of the interpolated range.

Some of the inventive principles of this disclosure relate to floating point to unorm conversion techniques that may employ a conservative rounding strategy that may ensure that the maximum and minimum interpolated values of an attribute are safely represented in unorm format. For example, in some embodiments, floating point numbers may be converted to unorm numbers in a manner that rounds maximum values upward and minimum values downward.

Figure 18:
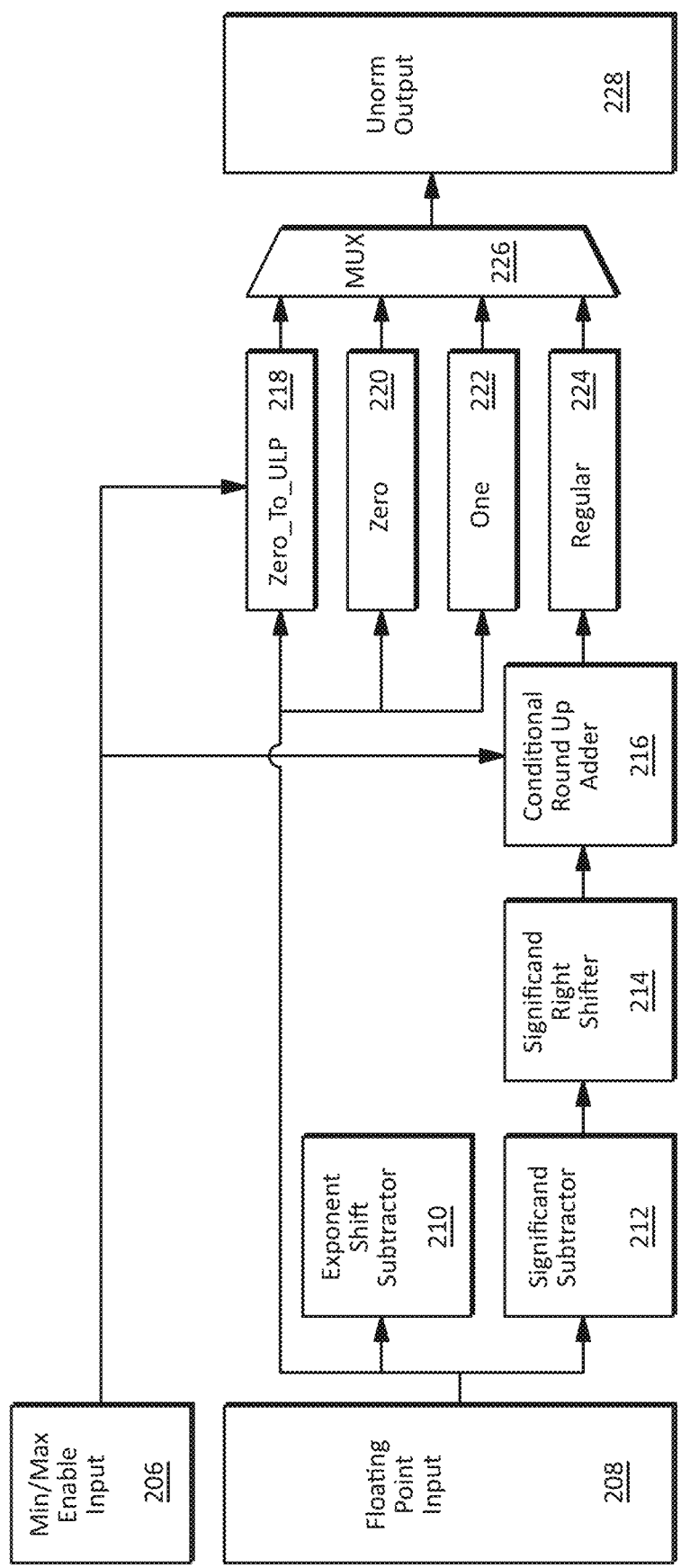
FIG. 18 illustrates an embodiment of a system and dataflow for converting floating point to unorm numbers according to this disclosure.

FIG. 18 illustrates an embodiment of a system and dataflow for converting floating point to unorm numbers according to this disclosure. The system of FIG. 18 may include an exponent shift subtractor 210, a significand subtractor 212, a significand right shifter 214, and a conditional round up adder 216. The system may further include registers 218, 220, 222, and 224 to hold zero-to-ULP (unit of least precision) results, zero results, one results, and regular (between zero and one) results, respectively. The system may further include a 4-to-1 multiplexer 226 to select final output value 228 from one of the four registers.

The system of FIG. 18 may operate by first converting a floating point input 208 to a fixed point value, and then to an n-bit unorm format. An exponent offset may be derived by subtracting the offset with a bias for (−1). An enhancement may be to limit the range of the exponent precision, for example, from 8-bits (256 values) to 5 bits (32 values) for a 32-bit floating point format, which may reduce the cost of the significand shifter 214. A fixed point value may then be obtained by shifting the floating point significand by the exponent offset. A pre-decoded value may then be obtained by multiplying the fixed point value by $2^n-1$ where n is the number of bits in the unorm format. This may be implemented, for example, with a constant n-shift of the fixed point value and subtraction of the original fixed point value. The pre-decoded value may then be rounded using strategy based on the status of an input minimum/maximum enabled signal 206. If enabled, a pre-decoded maximum value may be rounded toward infinity, otherwise, it may be rounded based on the most significant bit minus n (MSB−n).

The use of parallelized registers 220, 222, and 224 for zero, one, and regular cases, respectively, may be implemented as an enhancement that may reduce the conversion cost by reducing the need to adjust for overflow. The additional register 218 for zero-to-ULP numbers may help reduce the cost of the significand shifter. For example, the unorm 16 (16-bit unorm) conservative value for a small result may be 16'h0001 for a maximum and 16'h0000 for a minimum value.

Table 4 illustrates example pseudocode that may be suitable for implementing a floating point to n-bit unorm conversion according to this disclosure. In the embodiment of FIG. 4, max_en may correspond to a maximum enable input similar to the minimum/maximum enabled signal 206 in the embodiment of FIG. 18.

TABLE 4

```
1   //----------------------------------------------------------------
2   // Floating Point Extraction
3   //----------------------------------------------------------------
4   A_sign              = flp32[31];
```

TABLE 4-continued

```
5   A_exp[7:0]          = fp32[30:23];
6   A_signif[22:0]      = fp32[22:0];
7   //-------------------------------------------------------------
8   // pre-decode
9   //-------------------------------------------------------------
10  A_exp_ge_7f         = (A_exp[7:0] >= 8'h7f);
11  A_exp_le_60         = (A_exp[7:0] < 8'h60);
12  A_exp_gr_00         = (A_exp[7:0] > 8'h00);
13  A_nan               = (&(A_exp)) & (|(A_signif))
14  A_positive_zero     = (fp32_in==32'd0) ? 1'b1 : 1'b0;
15  // result
16  result_0            = (A positive zero | A_sign | A_nan);
17  result_0_to_small   = (~A_sign & A_exp_le_60);
18  result_1            = A_exp_ge_7f;
19  //-------------------------------------------------------------
20  // Shift Amount
21  //-------------------------------------------------------------
22  // calculate shift from 2^n - 1
23  // exp[4:0]== 1e translates to exp = 7e = 126(biased) = 2^n-1
24  shift[4:0]          = 5'h1e - A_exp[4:0];
25  //-------------------------------------------------------------
26  // Significand operation {0. 1 M } * (2^n - 1)
27  //-------------------------------------------------------------
28  diff_a              = {16'h0000, {1'b1, A_signif[22:0]}};
29  // subtractor
30  diff                = {1'b1, A_signif[22:0], 16'h0000} - diff_a;
31  // shifter
32  diff_shifted        = {diff, 32'd0} >> shift[4:0];
33  // round-conservative up
34  diff_shifted__rnd16 = {diff_shifted [MSB: MSB-n+1]} +
35                        {{n {1'b0}}, (max_en & (|diff_shifted [MSB-n: 0]))};
36  // final output
37  if (result_0) {
38       unorm_out      =  16'h0000;
39  }
40  else if (result_0_to_small) {
41       unorm_out         {15'h0000,max_en};
42  }
43  else if (result_1) {
44       unorm_out         16'hffff;
45  }
46  else {
47       unorm_out      =  diff_shifted_rnd16[15:0];
48  }
```

The embodiments illustrated with respect to FIG. 18 and Table 4 may be implemented in a conservative manner as described above. That is, they may employ a conservative rounding strategy that may ensure that the maximum and minimum interpolated values of an attribute are safely represented in converted number format by rounding maximum values upward and minimum values downward. Although some embodiments have been described in the context of converting floating point numbers to unorm numbers, the inventive principles may be applied to conversions between any different number formats that may be used for range interpolation or any other operation involving format conversions.

Hardware/Software

Although some of the embodiments disclosed herein may have been described in the context of certain hardware and/or software embodiments, any or all of the inventive principles may be implemented in hardware, software, or any combination thereof.

Figure 19:
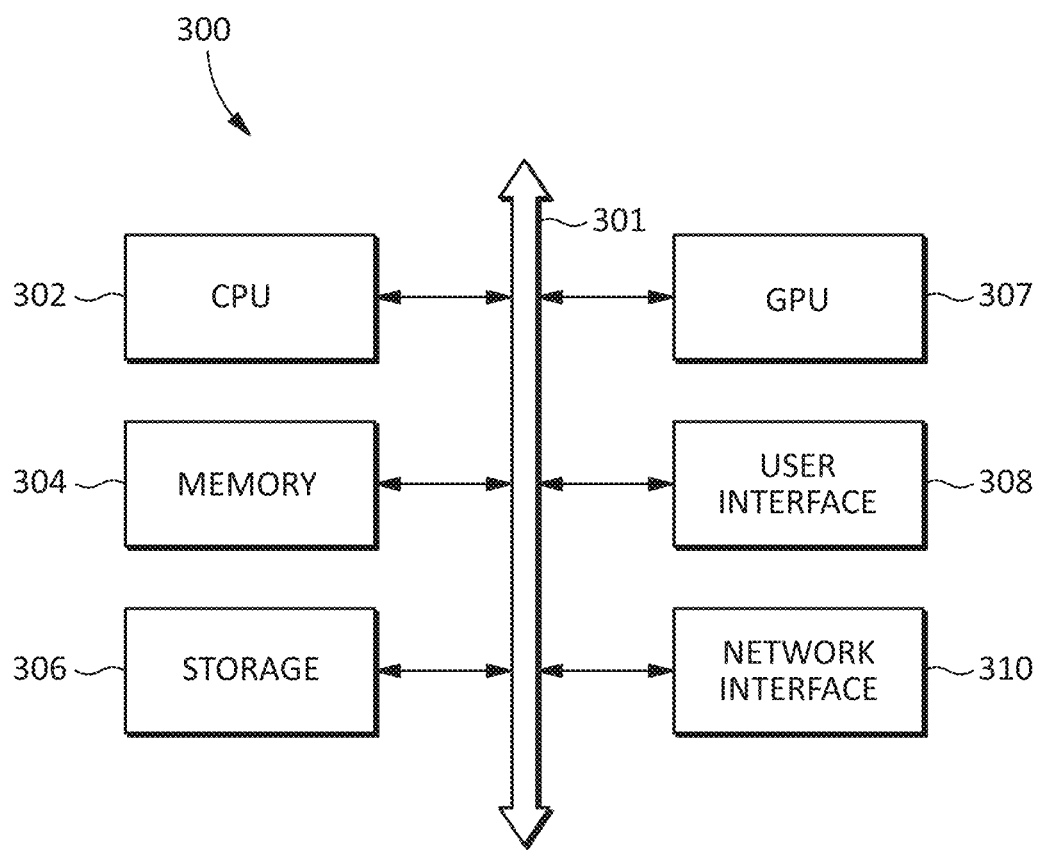
FIG. 19 illustrates an embodiment of a computing system according to this disclosure.

FIG. 19 illustrates an embodiment of a computing system according to this disclosure. The system 300 of FIG. 19 may be used to implement any or all of the methods and/or apparatus described in this disclosure. The system 300 may include a central processing unit (CPU) 302, memory 304, storage 306, a graphics processing unit (GPU) 307, a user interface 308, and a network interface 310. By way of example, a hybrid hardware/software implementation of an interpolation system according to this disclosure may be realized in the GPU 307 which may include specialized hardware for performing in graphics computation but which may still have a level of programmability to configure the hardware. In contrast, a full software implementation may be realized entirely within code executing on the CPU 302. The principles of this disclosure are not limited to implementation with any of the components illustrated in FIG. 19 but may be realized with any suitable hardware, software or combinations thereof.

In different embodiments, the system may omit any of these components or may include duplicates, or any additional numbers of, any of the components, as well as any other types of components to implement any of the methods and/or apparatus described in this disclosure.

The CPU 302 may include any number of cores, caches, bus, and/or interconnect interfaces and/or controllers. The Memory 304 may include any arrangement of dynamic and/or static RAM, nonvolatile memory (e.g., flash memory) etc. The storage 306 may include hard disk drives (HDDs), solid state drives (SSDs), and/or any other type of data storage devices or any combination thereof. The user interface 308 may include any type of human interface devices such as keyboards, mice, monitors, video capture or transmission devices, microphones, speakers touchscreens, etc.

as well as any virtualized or remote versions of such devices. The network interface 310 may include one or more adapters or other apparatus to communicate through Ethernet. Wi-Fi, Bluetooth, or any other computer networking arrangement to enable the components to communicate through physical and/or logical networks, such as an intranet, the Internet, local area networks, wide area networks, etc.

Any or all of the components of the system 300 may be interconnected through a system bus 301 which may collectively refer to various interfaces including power buses, address and data buses, high-speed interconnects such as Serial AT Attachment (SATA). Peripheral Component Interconnect (PCI), Peripheral Component Interconnect Express (PCI-e), System Management Bus (SMB), and any other types of interfaces that may enable the components to work together, either locally at one location, and/or distributed between different locations.

The system 300 may also include various chipsets, interfaces, adapters, glue logic, embedded controllers, such as programmable or non-programmable logic devices or arrays, application specific integrated circuits (ASICs), embedded computers, smart cards, and the like, arranged to enable the various components of the system 300 to work together to implement any of the all of the methods and/or apparatus described in this disclosure. Any of the components of the system 300 may be implemented with hardware, software, firmware, or any combination thereof. In some embodiments, any or all of the components may be realized in a virtualized form and/or in a cloud-based implementation with flexible provisioning of resources, for example within a data center, or distributed throughout multiple data centers.

The blocks or steps of a method or algorithm and functions described in connection with the embodiments disclosed herein may be embodied directly in hardware, in one or more software modules executed by a processor, or in a combination of the two, including in the system 300. If implemented in software, functions may be stored or transmitted as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium. Any system disclosed herein, or component or portion thereof, may be implemented as a part of a software stack of a larger system, for example, a graphics processing unit (GPU) or other larger system. Any system disclosed herein, or component or portion thereof, may be implemented as its own software stack.

Figure 20:
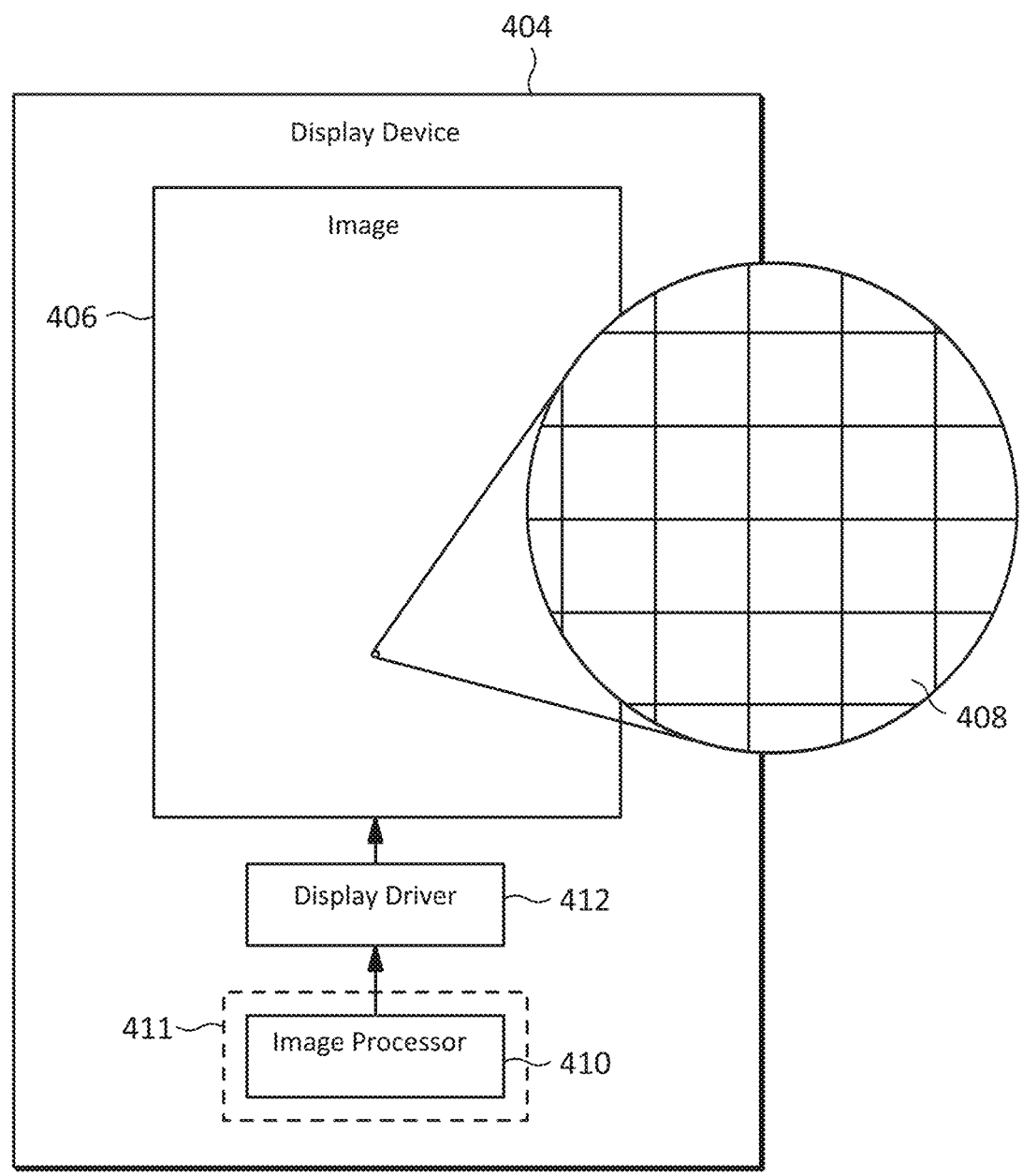
FIG. 20 illustrates an embodiment of an image display device according to this disclosure.

FIG. 20 illustrates an embodiment of an image display device 404 into which any of the methods or apparatus described in this disclosure may be integrated. The display device 404 may have any form factor such as a panel display for a PC, laptop, mobile device, etc., a projector, VR goggles, etc., and may be based on any imaging technology such as cathode ray tube (CRT), digital light projector (DLP), light emitting diode (LED), liquid crystal display (LCD), organic LED (OLED), quantum dot, etc., for displaying a rasterized image 406 with pixels. An image processor 410 such as graphics processing unit (GPU) and/or driver circuit 412 may process and/or convert the image to a form that may be displayed on or through the imaging device 404. A portion of the image 406 is shown enlarged so pixels 408 are visible. Any of the methods or apparatus described in this disclosure may be integrated into the imaging device 404, processor 410, and/or display driver circuit 412 to interpolate any of the pixels 408 shown in FIG. 20, and/or ranges for blocks thereof. In some embodiments, the image processor 410 may include a multi-block interpolator and/or scheduling unit and/or format conversion unit, such as any of those described above, implemented on an integrated circuit 411. In some embodiments, the integrated circuit 411 may also include the driver circuit 412 and/or any other components that may implement any other functionality of the display device 404.

The embodiments disclosed above have been described in the context of various implementation details, but the principles of this disclosure are not limited to these or any other specific details. For example, some functionality has been described as being implemented by certain components, but in other embodiments, the functionality may be distributed between different systems and components in different locations and having various user interfaces. Certain embodiments have been described as having specific processes, steps, etc., but these terms also encompass embodiments in which a specific process, step, etc. may be implemented with multiple processes, steps, etc., or in which multiple process, steps, etc. may be integrated into a single process, step, etc. A reference to a component or element may refer to only a portion of the component or element. Although the principles of this disclosure have been described in the context of certain applications, the principles may be applied for any attribute interpolation and/or rasterizer process, and they may be useful in any mathematical computation using edge equations, plane equations, or any other equation to interpolate or extrapolate one or more values and/or ranges of values.

The use of terms such as "first" and "second" in this disclosure and the claims may only be for purposes of distinguishing the things they modify and may not indicate any spatial or temporal order unless apparent otherwise from context. A reference to a first thing may not imply the existence of a second thing. Various organizational aids such as section headings and the like may be provided as a convenience, but the subject matter arranged according to these aids and the principles of this disclosure are not limited by these organizational aids.

The various details and embodiments described above may be combined to produce additional embodiments according to the inventive principles of this patent disclosure. Since the inventive principles of this patent disclosure may be modified in arrangement and detail without departing from the inventive concepts, such changes and modifications are considered to fall within the scope of the following claims.

The invention claimed is:

1. A interpolation method for rendering pixels comprising:
    scheduling spatially adjacent image blocks for interpolation, wherein the scheduling comprises:
        selecting a first covered image block of an input array;
        selecting a second covered image block of the input array, wherein the first covered image block is spatially adjacent with the second covered image block; and
        arranging the spatially adjacent first covered image block and second covered image block in a first array;
    calculating ranges of values of an attribute of the first and second covered image blocks in the first array, wherein the calculating comprises:
        calculating a first root value of the attribute at a first root location of the first array, adding incremental values of the attribute to the first root value at points of the image blocks of the first array that are offset from the first root location, comparing values of the attribute for each image block of the first array, and selecting a minimum and a maximum values of the attribute for each image block of the first array;

further calculating a second root value of the attribute at a second root location of a second array of the spatially adjacent image blocks, wherein the second array is spatially adjacent to the first array;

further adding incremental values of the attribute to the second root value at points of the image blocks of the second array that are offset from the second root location;

wherein values for one or more points of the image blocks in the second array that are coincident with the image blocks in the first array are omitted from calculations of the second root value and associated incremental values for the second array; and outputting the selected minimum and maximum values of the attribute to render a reduced number of pixels.

2. The method of claim 1, wherein:
the attribute has a gradient with a direction; and
the incremental values of the attribute are added to the first and the second root values at points determined by the direction of the gradient.

3. The method of claim 2, wherein the points determined by the direction of the gradient comprise diagonally opposite points of each image block.

4. The method of claim 3, wherein calculating the ranges of values further comprises selecting the diagonally opposite points of each image block as the minimum and maximum values of the attribute for the image block.

5. The method of claim 1, wherein the first root location is centrally located in the first array blocks and the second root location is centrally located in the second array.

6. The method of claim 5, wherein:
the attribute has a gradient with a direction; and
the incremental values of the attribute are added to the first and the second root values at points determined by the direction of the gradient.

7. The method of claim 6, wherein the points determined by the direction of the gradient comprise diagonally opposite points of each image block.

8. The method of claim 7, wherein calculating the ranges of values further comprises selecting the diagonally opposite points of each image block as the minimum and maximum values of the attribute for the image block.

9. The method of claim 1, wherein one or more values for one or more image blocks in the first array are used for one or more image blocks in the second array.

10. The method of claim 1, wherein:
the input array includes a pattern of covered image blocks that exceeds a size of the first array; and
the covered image blocks are arranged in two output arrays.

11. The method of claim 10, wherein the two output arrays are sent to an interpolator sequentially.

12. The method of claim 10, wherein selecting the first and the second covered image blocks comprises selecting horizontally or vertically aligned image blocks.

13. The method of claim 1, wherein the attribute is interpolated according to a plane equation.

14. The method of claim 1, wherein the second root value is calculated using the first root value.

15. An interpolation system for rendering pixels comprising:

a scheduling apparatus configured to send an input array of image blocks to an interpolator, wherein the input array comprises spatially adjacent image blocks, wherein the scheduling apparatus is configured to:
select a first covered image block of the input array;
select a second covered image block of the input array, wherein the first covered image block is spatially-adjacent with the second covered image block; and
arrange the spatially adjacent first covered image block and second covered image block in a first array;

a multi-block interpolator configured to perform the following:
calculate ranges of values of an attribute of the first and second covered image blocks in the first array by:
calculating a first root value of the attribute at a first root location of the first array,
adding incremental values of the attribute to the first root value at points of the image blocks of the first array that are offset from the first root location,
comparing values of the attribute for each image block of the first array, and
selecting a minimum and a maximum values of the attribute for each image block of the first array;
further calculate a second root value of the attribute at a second root location of a second array of the spatially adjacent image blocks, wherein the second array is spatially adjacent to the first array;
further add incremental values of the attribute to the second root value at points of the image blocks of the second array that are offset from the second root location;
wherein values for one or more points of the image blocks in the second array that are coincident with the image blocks in the first array are omitted from calculations of the second root value and associated incremental values for the second array; and
output the selected minimum and maximum values of the attribute to render a reduced number of pixels.

16. The interpolation system of claim 15, wherein the second root value is calculated using the first root value.

17. A multi-block interpolator comprising:

a root circuit configured to interpolate a root value of an attribute at a root location of an array of spatially adjacent image blocks, wherein the array of spatially adjacent image blocks includes a first array of spatially adjacent image blocks and a second array of spatially adjacent image blocks, wherein the second array is spatially adjacent to the first array, and wherein a first root value of the attribute is calculated at a first root location of the first array and a second root value of the attribute is calculated at a second root location of the second array;

a delta generator configured to calculate the following:
a first set of incremental values of the attribute at points of the image blocks of the first array that are offset from the first root location, and
a second set of incremental values of the attribute at points of the image blocks of the second array that are offset from the second root location;

at least one adder configured to calculate:
a first set of values of the attribute at the points of the image blocks of the first array that are offset from the first root location by adding the first set of incremental values to the first root value, and a second set of values of the attribute at the points of the image blocks of the second array that are offset from the second root location by adding the second set of incremental values to the second root value; and a multiplexer configured to select:
- a minimum or maximum of the first root value of the attribute at the first root location and the first set of values at the points offset from the first root location, and
- a minimum or maximum of the second root value of the attribute at the second root location and the second set of values at the points offset from the second root location;

wherein, as part of calculating the second set of incremental values, the delta generator is configured to omit calculations of the incremental values for one or more points of the image blocks in the second array that are coincident with the image blocks in the first array.

18. The interpolator of claim 17, wherein the second root value is calculated using the first root value.

* * * * *